(12) United States Patent
Minborg et al.

(10) Patent No.: US 7,929,470 B2
(45) Date of Patent: *Apr. 19, 2011

(54) METHOD AND APPARATUS FOR EXCHANGE OF INFORMATION IN A COMMUNICATION NETWORK

(75) Inventors: Per-Åke Minborg, Stora Höga (SE); Timo Pohjanvuori, Göteborg (SE)

(73) Assignee: Sony Ericsson Mobile Communications AB, Lund (SE)

( * ) Notice: Subject to any disclaimer, the term of this patent is extended or adjusted under 35 U.S.C. 154(b) by 2330 days.

This patent is subject to a terminal disclaimer.

(21) Appl. No.: 10/169,414

(22) PCT Filed: Jan. 18, 2001

(86) PCT No.: PCT/SE01/00079
§ 371 (c)(1), (2), (4) Date: Sep. 4, 2002

(87) PCT Pub. No.: WO01/54364
PCT Pub. Date: Jul. 26, 2001

(65) Prior Publication Data
US 2003/0135586 A1     Jul. 17, 2003

Related U.S. Application Data

(63) Continuation of application No. 09/644,307, filed on Aug. 23, 2000, now Pat. No. 6,996,072.

(60) Provisional application No. 60/176,806, filed on Jan. 19, 2000.

(51) Int. Cl.
*H04L 5/22* (2006.01)

(52) U.S. Cl. .............. 370/300; 370/356; 370/260
(58) Field of Classification Search .............. 370/352, 370/338, 354, 353, 300, 356, 260
See application file for complete search history.

(56) References Cited

U.S. PATENT DOCUMENTS
5,157,710 A    10/1992  Itoh
(Continued)

FOREIGN PATENT DOCUMENTS
DE    19737126    3/1999
(Continued)

OTHER PUBLICATIONS

Minborg, Per-Ake; "Method and Apparatus for Exchanging of Information in a Communication Network" 2002; pp. 1-73.*

(Continued)

*Primary Examiner* — Ricky Ngo
*Assistant Examiner* — Dewanda Samuel
(74) *Attorney, Agent, or Firm* — Coats & Bennett, P.L.L.C.

(57) ABSTRACT

A technique for connecting a unique identifier to a data object is described. The connecting of a unique identifier such as a telephone number or an internet address such as an IPv6 address, to a specific data object, hereafter referred to as phonepage, will allow an A-party direct access to information that a B-party or B-party user equipment wishes to display to a connecting party. The phonepage resides in a memory in a telecommunications or data network. The phonepage may have a similar appearance to an Internet web page, but may also take other appearances. The displaying or processing of the phonepage may be made dependent upon the capabilities of the A-party user equipment.

19 Claims, 12 Drawing Sheets

U.S. PATENT DOCUMENTS

| | | | |
|---|---|---|---|
| 5,289,530 A | 2/1994 | Reese | |
| 5,305,372 A | 4/1994 | Tomiyori | |
| 5,329,591 A | 7/1994 | Magrill | |
| 5,398,279 A | 3/1995 | Frain | |
| 5,533,922 A | 7/1996 | Yamaharu | |
| 5,561,704 A | 10/1996 | Salimando | |
| 5,588,042 A | 12/1996 | Comer | |
| 5,613,205 A | 3/1997 | Dufour | |
| 5,689,563 A | 11/1997 | Brown et al. | |
| 5,708,702 A | 1/1998 | De Paul et al. | |
| 5,712,979 A | 1/1998 | Graber et al. | |
| 5,757,894 A | 5/1998 | Kay et al. | |
| 5,761,279 A | 6/1998 | Bierman et al. | |
| 5,771,279 A | 6/1998 | Cheston, III et al. | |
| 5,805,823 A * | 9/1998 | Seitz | 709/236 |
| 5,812,667 A | 9/1998 | Miki et al. | |
| 5,812,950 A | 9/1998 | Tom | |
| 5,844,978 A | 12/1998 | Reuss et al. | |
| 5,850,433 A | 12/1998 | Rondeau | |
| 5,854,976 A | 12/1998 | Garcia Aguilera et al. | |
| 5,878,347 A | 3/1999 | Joensuu et al. | |
| 5,889,861 A | 3/1999 | Ohashi et al. | |
| 5,893,031 A | 4/1999 | Hoogerwerf et al. | |
| 5,895,471 A | 4/1999 | King et al. | |
| 5,901,352 A | 5/1999 | St-Pierre et al. | |
| 5,920,815 A | 7/1999 | Akhavan | |
| 5,930,699 A | 7/1999 | Bhatia | |
| 5,930,703 A | 7/1999 | Cairns | |
| 5,933,486 A | 8/1999 | Norby et al. | |
| 5,940,598 A | 8/1999 | Strauss et al. | |
| 5,946,684 A | 8/1999 | Lund | |
| 5,948,066 A | 9/1999 | Whalen et al. | |
| 5,949,763 A | 9/1999 | Lund | |
| 5,950,121 A | 9/1999 | Kaminsky et al. | |
| 5,950,137 A | 9/1999 | Kim | |
| 5,952,969 A | 9/1999 | Hagerman et al. | |
| 5,963,626 A | 10/1999 | Nabkel | |
| 5,970,414 A | 10/1999 | Bi et al. | |
| 5,978,806 A | 11/1999 | Lund | |
| 5,991,749 A | 11/1999 | Morrill, Jr. | |
| 5,999,806 A | 12/1999 | Kaplan et al. | |
| 6,002,749 A | 12/1999 | Hansen et al. | |
| 6,005,870 A | 12/1999 | Leung et al. | |
| 6,006,097 A | 12/1999 | Hornfeldt et al. | |
| 6,006,251 A * | 12/1999 | Toyouchi et al. | 709/203 |
| 6,009,091 A | 12/1999 | Stewart et al. | |
| 6,014,090 A | 1/2000 | Rosen et al. | |
| 6,016,349 A | 1/2000 | Musa | |
| 6,018,654 A | 1/2000 | Valentine et al. | |
| 6,028,914 A | 2/2000 | Lin et al. | |
| 6,031,836 A | 2/2000 | Haserodt | |
| 6,047,174 A | 4/2000 | Frederick | |
| 6,049,713 A | 4/2000 | Tran et al. | |
| 6,058,301 A | 5/2000 | Daniels | |
| 6,058,310 A | 5/2000 | Tokuyoshi | |
| 6,064,887 A | 5/2000 | Kallioniemi et al. | |
| 6,067,546 A | 5/2000 | Lund | |
| 6,072,875 A | 6/2000 | Tsudik | |
| 6,075,993 A | 6/2000 | Kawamoto | |
| 6,078,581 A | 6/2000 | Shtivelman et al. | |
| 6,081,705 A | 6/2000 | Houde et al. | |
| 6,085,224 A | 7/2000 | Wagner | |
| 6,088,587 A | 7/2000 | Abbadessa | |
| 6,088,598 A | 7/2000 | Marsolais | |
| 6,091,808 A | 7/2000 | Wood et al. | |
| 6,091,945 A | 7/2000 | Oka | |
| 6,091,946 A | 7/2000 | Ahvenainen | |
| 6,094,168 A | 7/2000 | Duffett-Smith et al. | |
| 6,097,793 A | 8/2000 | Jandel | |
| 6,097,942 A | 8/2000 | Laiho | |
| 6,112,078 A | 8/2000 | Sormunen et al. | |
| 6,115,754 A | 9/2000 | Landgren | |
| 6,119,155 A * | 9/2000 | Rossmann et al. | 709/219 |
| 6,134,450 A | 10/2000 | Nordeman | |
| 6,138,158 A | 10/2000 | Boyle et al. | |
| 6,141,413 A | 10/2000 | Waldner et al. | |
| 6,154,646 A | 11/2000 | Tran et al. | |
| 6,157,708 A | 12/2000 | Gordon | |
| 6,157,841 A | 12/2000 | Bolduc et al. | |
| 6,161,008 A | 12/2000 | Lee et al. | |
| 6,161,134 A | 12/2000 | Wang et al. | |
| 6,163,598 A | 12/2000 | Moore | |
| 6,163,691 A | 12/2000 | Buettner et al. | |
| 6,163,794 A | 12/2000 | Lange et al. | |
| 6,169,897 B1 | 1/2001 | Kariya | |
| 6,173,048 B1 | 1/2001 | Malik | |
| 6,173,316 B1 * | 1/2001 | De Boor et al. | 709/218 |
| 6,181,928 B1 | 1/2001 | Moon | |
| 6,181,935 B1 | 1/2001 | Gossman et al. | |
| 6,185,184 B1 | 2/2001 | Mattaway et al. | |
| 6,188,756 B1 | 2/2001 | Mashinsky | |
| 6,192,123 B1 | 2/2001 | Grunsted et al. | |
| 6,192,251 B1 | 2/2001 | Jyogataki et al. | |
| 6,192,258 B1 | 2/2001 | Kamada et al. | |
| 6,199,099 B1 | 3/2001 | Gershman et al. | |
| 6,202,023 B1 | 3/2001 | Hancock et al. | |
| 6,205,204 B1 | 3/2001 | Morganstein et al. | |
| 6,208,659 B1 | 3/2001 | Govindarajan et al. | |
| 6,215,790 B1 | 4/2001 | Voit et al. | |
| 6,219,413 B1 | 4/2001 | Burg | |
| 6,219,694 B1 | 4/2001 | Lazaridis et al. | |
| 6,219,696 B1 | 4/2001 | Wynblatt et al. | |
| 6,226,367 B1 | 5/2001 | Smith et al. | |
| 6,226,668 B1 | 5/2001 | Silverman | |
| 6,233,234 B1 | 5/2001 | Curry et al. | |
| 6,233,608 B1 | 5/2001 | Laursen et al. | |
| 6,240,174 B1 | 5/2001 | Silver | |
| 6,243,443 B1 | 6/2001 | Low et al. | |
| 6,243,453 B1 | 6/2001 | Bunch et al. | |
| 6,246,758 B1 * | 6/2001 | Low et al. | 379/230 |
| 6,253,234 B1 | 6/2001 | Hunt et al. | |
| 6,256,498 B1 * | 7/2001 | Ludwig | 455/433 |
| 6,301,609 B1 | 10/2001 | Aravamudan et al. | |
| 6,311,057 B1 | 10/2001 | Barvesten | |
| 6,317,594 B1 * | 11/2001 | Gossman et al. | 455/414.1 |
| 6,320,946 B1 | 11/2001 | Enzmann et al. | |
| 6,324,542 B1 * | 11/2001 | Wright et al. | 707/104.1 |
| 6,327,355 B1 * | 12/2001 | Britt | 379/201.03 |
| 6,336,137 B1 * | 1/2002 | Lee et al. | 709/219 |
| 6,356,956 B1 * | 3/2002 | Deo et al. | 719/318 |
| 6,370,137 B1 | 4/2002 | Lund | |
| 6,381,465 B1 * | 4/2002 | Chern et al. | 455/466 |
| 6,411,704 B1 | 6/2002 | Pelletier et al. | |
| 6,424,828 B1 * | 7/2002 | Collins et al. | 455/412.1 |
| 6,469,998 B1 | 10/2002 | Burgaleta Salinas et al. | |
| 6,470,447 B1 | 10/2002 | Lambert et al. | |
| 6,480,883 B1 * | 11/2002 | Tsutsumitake | 709/203 |
| 6,496,579 B1 | 12/2002 | Mashinsky | |
| 6,507,908 B1 | 1/2003 | Caronni | |
| 6,522,875 B1 | 2/2003 | Dowling et al. | |
| 6,549,773 B1 * | 4/2003 | Linden et al. | 455/426.1 |
| 6,560,456 B1 * | 5/2003 | Lohtia et al. | 455/445 |
| 6,625,644 B1 | 9/2003 | Zaras | |
| 6,629,143 B1 * | 9/2003 | Pang | 709/226 |
| 6,640,240 B1 | 10/2003 | Hoffman et al. | |
| 6,647,108 B1 | 11/2003 | Wurster et al. | |
| 6,671,508 B1 | 12/2003 | Mitsuoka et al. | |
| 6,671,522 B1 * | 12/2003 | Beaudou | 455/558 |
| 6,687,340 B1 | 2/2004 | Goldberg et al. | |
| 6,718,178 B1 | 4/2004 | Sladek et al. | |
| 6,744,759 B1 | 6/2004 | Sidhu et al. | |
| 6,781,972 B1 | 8/2004 | Anderlind et al. | |
| 6,792,607 B1 | 9/2004 | Burd et al. | |
| 6,795,711 B1 * | 9/2004 | Sivula | 455/466 |
| 6,798,868 B1 | 9/2004 | Montgomery et al. | |
| 6,816,878 B1 | 11/2004 | Zimmers et al. | |
| 6,847,703 B2 | 1/2005 | Shibuya | |
| 6,889,321 B1 | 5/2005 | Kung et al. | |
| 6,895,237 B1 | 5/2005 | Scott | |
| 6,937,597 B1 | 8/2005 | Rosenberg et al. | |
| 6,959,193 B1 * | 10/2005 | Kim | 455/466 |
| 6,978,005 B2 | 12/2005 | Pernu et al. | |
| 6,983,138 B1 | 1/2006 | Helferich | |
| 7,058,686 B2 | 6/2006 | Jin | |
| 7,110,525 B1 | 9/2006 | Heller et al. | |
| 7,177,897 B2 * | 2/2007 | Manukyan | 709/200 |
| 7,221,741 B1 | 5/2007 | Suder et al. | |

| | | | |
|---|---|---|---|
| 7,269,253 | B1 | 9/2007 | Wu et al. |
| 7,313,782 | B2 * | 12/2007 | Lurie et al. .................. 717/104 |
| 2002/0059272 | A1 | 5/2002 | Porter |
| 2002/0068550 | A1 | 6/2002 | Tejada |
| 2002/0107906 | A1 | 8/2002 | Brockbank |
| 2002/0128002 | A1 | 9/2002 | Vu |
| 2003/0050052 | A1 | 3/2003 | Minborg et al. |
| 2003/0060211 | A1 | 3/2003 | Chern |
| 2003/0135586 | A1 | 7/2003 | Minborg et al. |
| 2003/0174684 | A1 | 9/2003 | Pohjanvuori et al. |
| 2004/0062374 | A1 | 4/2004 | Lund |
| 2004/0236792 | A1 | 11/2004 | Celik |
| 2007/0293205 | A1 | 12/2007 | Henderson |

FOREIGN PATENT DOCUMENTS

| | | |
|---|---|---|
| EP | 0 484 067 | 5/1992 |
| EP | 0 851 647 | 7/1998 |
| EP | 0 853 287 | 7/1998 |
| EP | 0 858 202 | 8/1998 |
| EP | 0858202 A2 * | 8/1998 |
| EP | 0 869 688 A2 | 10/1998 |
| EP | 0869688 A2 | 10/1998 |
| EP | 0 944 203 | 9/1999 |
| EP | 0 971 513 A2 | 1/2000 |
| EP | 1 041 808 | 10/2000 |
| EP | 1 069 789 | 1/2001 |
| EP | 1 089 519 | 4/2001 |
| EP | 1 111 505 A1 | 6/2001 |
| EP | 1 128 647 A2 | 8/2001 |
| GB | 2 338 150 | 12/1999 |
| WO | WO 94/23523 | 10/1994 |
| WO | WO 97/07644 | 2/1997 |
| WO | WO 97/13380 | 4/1997 |
| WO | WO 97/20441 | 6/1997 |
| WO | WO 97/22211 | 6/1997 |
| WO | WO 97/22212 | 6/1997 |
| WO | WO 97/31490 | 8/1997 |
| WO | WO 97/31491 | 8/1997 |
| WO | WO 98/11744 | 3/1998 |
| WO | WO 98/18283 | 4/1998 |
| WO | WO 98/19445 | 7/1998 |
| WO | 98/51056 A2 | 11/1998 |
| WO | WO 98/56159 | 12/1998 |
| WO | WO 98/56197 | 12/1998 |
| WO | 99/00751 A1 | 1/1999 |
| WO | WO 99/00751 * | 1/1999 |
| WO | WO 99/11078 | 3/1999 |
| WO | WO 99/35595 | 7/1999 |
| WO | WO 99//53621 * | 10/1999 |
| WO | WO 99/55107 | 10/1999 |
| WO | WO 00/04730 | 1/2000 |
| WO | WO 00/38458 | 6/2000 |
| WO | WO 00/39666 | 7/2000 |
| WO | WO 00/46697 | 8/2000 |
| WO | WO 00/64110 | 10/2000 |
| WO | WO 00/77662 | 12/2000 |
| WO | WO 00/78016 | 12/2000 |
| WO | WO 01/01077 | 1/2001 |
| WO | WO 01/05109 | 1/2001 |
| WO | WO 01/20475 | 3/2001 |
| WO | WO 01/54364 | 7/2001 |
| WO | WO 01/54373 | 7/2001 |

OTHER PUBLICATIONS

Dalgic, et al., "True Number Portability and Advanced Call Screening in a SIP-Based IP Telephony System", IEEE Communications Magazine, p. 96-101, Jul. 1999.

Smart Messaging Specification, Revision 2.0.0, Nokia Mobile Phones Ltd., May 17, 1999.

Digital Cellular Telecommunications System (Phase 2), Technical Realization of the Short Message Service (SMS) Point-to-Point (GSM03.40), ETSI, ETS 300 536, Fourth Edition, Oct. 1996.

Commonly Assigned U.S. Appl. No. 09/686,990, entitled "Exchange of Information in a Communication System", filed Oct. 17, 2000.

PCT—International Search Report dated Jun. 13, 2001, for Application No. PCT/SE01/00079, Filed Jan. 18, 2001.

PCT—International Search Report dated Jun. 13, 2001, for Application No. PCT/SE01/00094, Filed Jan. 19, 2001.

PCT—International Search Report dated Jul. 6, 2001, for Application No. PCT/SE01/00093, filed Jan. 19, 2001.

Lawrence Harte, et al., GSM Superphones, Table of Contents and Chapter 1, p. xi-xxii and 1-22, McGraw-Hill, 1999.

Christian Bettstetter, et al., "GSM Phase 2+ General Packet Radio Service GPRS: Architecture, Protocols, and Air Interface", IEEE Communications Surveys, <<http://www.comsoc.org/pubs/surveys>>, 13 pages, Third Quarter 1999, vol. 2, No. 3.

PCT—International Search Report for PCT/SE01/00071.

PCT—International Search Report for PCT/SE01/00080.

ETSI TS 101 267 (V.8.5.0) Technical Specification for Digital Telecommunications System (Phase 2+), Specification of the SIM Application Toolkit for the Subcriber Identity Module—Mobile Equipment (SIM-ME interface) (Global System for Mobile Communications: 1999).

International Search Report for PCT/SE00/01689, issued Dec. 8, 2000, four pages.

Schulzrinne, "A Comprehensive Multimedia Control Architecture for the Internet", Dept. of Computer Science, Columbia University, New York, NY, IEEE No. 0-7803-3799-9/97, 1997, p. 65-76.

Schulzrinne and Rosenberg, "Signalling for Internet Telephony", Columbia University and Bell Laboratories, respectively, ten pages.

PCT—International Search Report dated Aug. 5, 2008, for Application No. PCT/US2008/054982, Filed Feb. 26, 2008.

* cited by examiner

METHOD AND APPARATUS FOR EXCHANGE OF INFORMATION IN A COMMUNICATION NETWORK

RELATED APPLICATIONS

This application is a U.S. national stage application of international patent application PCT/SE2001/000079, filed Jan. 18, 2001, and claims priority under 35 U.S.C. §119(e) to provisional patent application U.S. 60/176,806, filed Jan. 19, 2000, and also claims priority under 35 U.S.C. §120 to and is a continuation of patent application U.S. Ser. No. 09/644,307, filed Aug. 23, 2000.

BACKGROUND

The present invention relates generally to a method and apparatus for exchanging information in a communication system. More specifically, the invention relates to a communication system, which connects to a private or public data communication network and to a public or private telecommunication network.

The present evolution of data-communication is such that more and more users gain access to the Internet worldwide. Internet has become both a source of knowledge but also a market place for business, and it is attracting more and more users. Currently there is a high pressure on the data-communications industry to provide solutions that allow everyone to gain access to Internet. Broadband solutions are continuously developed and both local as well as national access networks are planned and launched. The presently most common method of modem access through the telecommunications network (e.g., the Public Switched Telecommunication Network, PSTN provider) is being replaced by other ways of access, with a possibility to higher data rates, e.g., through electric power lines or cable TV.

At the same time, the telecommunications industry is struggling another battle; that of providing mobility to each and every user. Traditionally, telecommunication has been focused on voice communication. With the increase of data communication however, other demands are arising (e.g., higher data rate transfer), but also new possibilities. Evolutions of mobile systems are presently in a period when more and more packet-based systems will be deployed. Packet switched systems has, in contrast to circuit switched systems, certain advantages when it comes to transfer of data-communication. In a packet switched system, a user is only utilizing a transmission resource when system control signaling or user information is transmitted. In a circuit switched system, a user is allocated a transmission resource continuously, even though no current transfer is active. Circuit switched systems has some obvious advantages in real-time voice communication, since it is difficult to predict the communication for real time transfer. For data-communication, it is not as important to predict the transmission resources required, since the demands on delay and delay variations are not as crucial to the communication quality as for voice. It is therefore possible to allow more users onto the transmission resources by allowing usage thereof only when there is something to transmit and leave the channel available for additional users otherwise.

One such system is the packet data evolution of the mobile communication system pursuant to the ETSI GSM specification, called General Packet Radio Service (GPRS). With GPRS, higher bit rates and more users may be allowed than what is possible today, when data communication is deployed on a circuit switched channel. GPRS is a step towards mobility for data communication users, in contrast to GSM, which is optimized for mobility for "traditional" telecommunication users, i.e., real-time voice communication users.

The data-communication run over the telecommunications networks today is usually initiated by an access to an Internet- or a mail server. A user logs on to a distant server and accesses the data-communications network through e.g., modem pools. The user dials up the modem pool and is therefrom connected to a server, from which access can be made to both local as well as global networks. Browsers like e.g., Microsoft Explorer or Netscape Navigator are used to navigate on the Internet and switch between Internet pages or addresses. Users and institutions usually design their own data objects, or homepages, on an internal or external network that provides personal information or any other kind of information. Once connected to the data network a user may access these data objects by entering the correct address. The address is often selected by combining a node name in the network (e.g. server name) and an arbitrary text-string. Typically, it is not trivial to find a desired data object, since the text strings and server names are not obvious.

Addressing in a telecommunications network, e.g., when engaging in a voice or data communication is usually performed by entering a telephone number on a User Equipment (UE), like a mobile telephone or a terminal with a facsimile functionality. A telephone number is a, world-wide, unique addressing string. A calling party (A-party) dials the addressing string (B-number) to the called party (B-party). Dependent on what type of network the A-party is a subscriber on, the call request is routed through one or several public telecommunication networks to the correct addressee and the communication may begin. Other unique addressing strings are for example email addresses, IPv4 addresses, IPv6 addresses, and sip (session initiation protocol) addresses.

The above principle also applies when a user wish to connect to the Internet from a computer connected to a telecommunications network. The user connects to a data-communications network by dialing a B-number to a modem pool, from which accessing the data-communications network is possible. There are no information or interaction possibilities with the called server other than this access opportunity.

Applicants have identified that there is a problem in the present way of accessing the Internet for specific data objects because of the non-obvious way of addressing data objects. There is further a need in the telecommunications industry to provide a simpler way of accessing the Internet and to guide a user by other means than a modem number to call, from where the user is left on her own to be further guided to the desired homepage or data object.

SUMMARY

The present invention overcomes the above identified deficiencies of identifying and finding a data object and navigate between a set of data objects by applying a novel connection between a data-communications network and a telecommunications network or a novel connection between different services in a data communication network.

In one aspect of the present invention a technique for connecting a unique identifier of a B-party, such as a dialed B-party number, an internet address such as an email address, an IPv4 address, a sip address, or an IPv6 address, to a data object is described. A B-party can, for example, be a person, a fax, a mail server, a mail client, or homepage accesses. The connecting of a B-party number to a specific data object, hereafter referred to as phonepage, will allow an A-party direct access to information that a B-party wishes to display or process to a calling/connecting party. The phonepage resides in a memory in a telecommunications network, or in a memory in a data-communications network connected thereto. The phonepage may have a similar appearance to an Internet web page, but may also take other appearances such as being accoustic or a program. The displaying/processing of the phonepage may be made dependent upon the capabilities of the A-party user equipment.

Dependent on the type of equipment used by the A-party, the node storing the phonepages may, upon detection of type of equipment, select the most advantageous way of displaying a selected data object.

Also, dependent on the A-party user equipment, the phonepage may provide different levels of interaction possibilities, i.e., only display information, or be a fully interactive data object with a duplex communication between the A-party and the node housing the memory in which the phonepage is stored.

The phonepages may be configured to be displayed automatically or by indication from the A-party. In a variant of the invention also a B-party has the same capabilities of obtaining phonepages upon reception of a unique identifier of the A-party such as an A-number, A-party email address, IPv4 address, sip address, or IPv6 address, in conjunction with an incoming communication.

In another aspect of the present invention, a node in a data-communication or telecommunication system is described. The node consists of at least a data base memory including at least indications of the phonepages and upon access from a remote request, respond with said indication.

The transfer of the indication to a calling A-party may be dependent on type of connection and access technology used in the connection. For example in a connection where both circuit switched and packet switched communication is simultaneously possible, the indication may be transferred on a packet switched communication resource and, e.g., voice communication may be initiated on the circuit switched communication resource. In other types of connections, two data flows may be set-up on one or several simultaneous packet switched communication resources, e.g. speech and data transfer. Another example is when voice communication is initiated over a circuit switched communication resource and the phonepage indications are transferred over a packet switched channel with limited performance such as an SMS channel. In still another example two data communication channels are used, one for, for example, chat or email, the other for the phonepage indications.

According to the invention a method of retrieving an object to a first user communication application in connection with establishment of a communication service with a second user communication application comprises a number of steps in the first user communication application. In a first step determining an occurance of a triggering event. In a second step acquiring a communication service address associated with the triggering event. In a third step assembling a request for a data object associated with the communication service address, the request comprising at least two parameters, a first parameter representing the communication service address and a second parameter representing the determined triggering event. In a fourth step sending the request for the data object to a data object server. In a fifth step receiving the data object or an indication of the data object from the data object server in view of the parameters. In a sixth step processing the received data object or indication of the data object.

Preferably the type of communication service determines the data object server. Advantageously the communication service address is also associated with second user communication application. A parameter of the request can be a representation of a code indicating which communication types are available to the first user communication application. A parameter of the request can be a representation of a code indicating a priority of use of the communication types available to the first user communication application. A parameter of the request can be a representation of a code indicating the desired communication service with the second user communication application. The communication service address can be an access address of the first user equipment or an access address of the second user equipment. Either the first user communication application is an originating application and the second user communication application is a terminating application or the second user communication application is an originating application and the first user communication application is a terminating application. A parameter of the request can be a representation of a code indicating data bearer type. A parameter of the request can be a representation of a code indicating the type of the user equipment of the first or the second user communication application. A parameter of the request can be a representation of a code indicating an available and/or attached accessory. A parameter of the request can be a representation of a code indicating the version of the method. Preferably the request is encrypted before sending. Advantageously the received data object is encrypted and in that the step of processing comprises decryption of the data object. The triggering event can comprise an event of an outgoing communication being or is about to be initiated. Advantageously the step of determining a triggering event further determines if there are any additional triggering events during the time a communication is being conducted to thereby be able to initiate further data object requests during the communication. The triggering event can be an event of a designated button on a user equipment being pressed. A parameter of the request can be a representation of a code identifying a data object server, then the representation of a code identifying a data object server can represent a server name or a plain IP address.

According to the invention a telecommunication or data system comprises a first user equipment with a first user communication application, a second user equipment with a second user communication application, and a communication network to establish a communication service channel between the first user application and the second user application, and a data object server. The first user equipment is arranged to determine the occurance of a triggering event, acquire a communication service address associated with the triggering event, and assemble a request of a data object associated with the communication service address, the request comprising parameters suggested in the application to be at least two parameters, a first parameter representing the communication service address and a second parameter representing the determined triggering event, and is arranged to possibly optionally encrypt and then send the request for the data object to the data object server. Other sets of parameters can also be considered within the scope of the invention. The data object server is arranged to return the data object or an indication of the data object in view of the parameters to the first user application in response to the request. The first user equipment is arranged to receive the data object or the indication of the data object from the data object server and to then process the received data object or the indication of the data object.

According to the invention a method of retrieving an object in a first user equipment connectable via a first communication channel with a second user equipment comprises a number of steps. In a first step acquiring an address indication. In a second step determining the occurance of a triggering event assembling a request for an object associated with the address indication, the request comprising at least two parameters, a first parameter representing the acquired address indication and a second parameter representing the determined triggering event. In a third step sending the request for the object via a second communication channel to a data object server. In a fourth step receiving the data object or an indication of the object from the data object server in view of the parameters. And finally in a fifth step processing the received object or indication of the object.

In some versions of the method the first communication channel and the second communication channel are concurrent communication channels. In other versions of the method the first communication channel and the second communication channel are non-concurrent communication channels.

The first communication channel is can be either circuit switched communication or a packet switched communication channel and the second communication channel can be either a circuit switched communication channel or a packet switched communication channel.

The address indication can advantageously either be a telephone number, or an internet address such as an IP address, or an email address of the first user equipment and/or of the second user equipment.

In some versions of the method the first user equipment is an originating user equipment and the second user equipment is a terminating user equipment. In other versions of the method the second user equipment is a originating user equipment and the first user equipment is a terminating user equipment.

Advantageously a parameter of the request can be one or more of a representation of a code indicating home operator, a representation of a code indicating data bearer type, a representation of a code indicating the vendor, a representation of a code indicating the type of the user equipment, a representation of a code indicating an available and/or attached accessory such as a handsfree set, a chatboard, an mp3 player, a radio, a barcode reader, a PDA, and/or any blue tooth equipment, a representation of a code indicating if an accessory, eg. a handsfree accessory, such as a headset or a car handsfree set, is active or not (an active handsfree acessory will entail an audio data object), or a representation of a code indicating the version of the method.

Preferably request is encrypted before sending. Advantageously the received data object is encrypted and in that the step of processing comprises decryption of the data object.

A triggering event can be one or more of an event of an outgoing call being or is about to be initiated, an event of an addressed called party answering a call, an event of an addressed called party being busy, an event of an addressed called party not answering, an event of an addressed called party rejecting a call, an event of an incoming call being imminent or having just started, an event of a call being disconnected, an event of a call being conducted. A triggering event can also be one or more of a new cell in the public land mobile network (PLMN) has been selected, or the location of a subscriber has changed. Preferably when the address indication is a representation of the new cell or the location of the subscriber, and in that the requested data object is related to the new cell or the location of the subscriber such as a local advertisement. A triggering event can be that a new Public Land Mobile Network (PLMN) operator is selected. Preferably when the address indication is a representation of the new Public Land Mobile Network operator, then the requested data object can be related to the new Public Land Mobile Network operator, such as comprising a pricelist of the new Public Land Mobile Network operator to be presented. A triggering event can be that a new country of registration is made. Preferably when the address indication is a representation of the new country of registration, then the requested data object is related to the new country.

In some versions of the method the step of determining a triggering event further determines if there are any additional triggering events during the time a call is being conducted to thereby be able to initiate further data object requests during the call.

Advantageously commercial information can be sold by calling a telephone number or accessing a homepage and the triggering event can then be payment completion, such as when the call is connected by means of the first communication channel or when the call is disconnected. Preferably the data object is either the commercial information or a representation of the commercial information.

The triggering event can be an event of a designated button on a user equipment being pressed. Then the address indication can for example be a telephone number or IPv6 address comprised in a list in the first user equipment. The address indication can be an address indication of either one of a missed incomming communication, an outgoing communication, or an incoming communication, the address indication being for example either a telephone number, an email address, an IPv4 address, a sip address, or an IPv6 address.

Advantageously a parameter of the request can be a representation of a code identifying a data object server. Then the representation of a code identifying a data object server preferably represents a server name or a plain IP address.

Whenever the first user equipment is not involved in a call or upon call completion, data objects can be obtained from the data object server and stored locally in the first user equipment to be readily available upon the next triggering event.

Advantageously a universal resource locator of the data object server is preprogrammed into the first user equipment.

In some versions of the method the data object server is at least logically divided into a name server and an object server, and in that the step of sending the request for the object via a second communication channel is sent to the name server. Then in some versions the step of receiving the indication of the object from the data object server can comprise a step of receiving the indication of the object from the name server, and then additionally that the step of processing the indication of the object comprises the steps of sending a request for the object to the object server by means of the received indication of the object, receiving the data object from the object server in view of the parameters, and processing the received object. Then in other versions the step of receiving the data object from further comprises the steps of the name server dispatching the request for the object to the object server, and receiving the data object from the object server in view of the parameters. A universal resource locator of the name server can preferably preprogrammed into the first user equipment.

In some versions, the received object or indication of the object is from a selection of data objects in dependence of an identity of the requester, e.g. a returned phonepage to a requester may take different appearances in dependence of who is requesting the phonepage.

In some versions, the received object comprises a sound which at least temporarily replaces, or is added to, a calling sound of the first user equipment. In other versions the received object comprises a sound, and in that a calling sound of the first user equipment is at least temporarily muted, the sound being rendered instead of the calling sound.

One embodiment of the invention is a stationary telephone comprising graphic possibilities, which telephone executes any version of the method according to the invention as described herein. Another embodiment of the invention is a mobile telephone comprising a central processing unit, a memory unit, and at least one display, which mobile telephone executes any version of the method according to the invention as described herein. A further emodiment of the invention is a mobile telephone comprising a central processing unit, a memory unit, a removable memory unit (e.g. a SIM card) and at least one display, which mobile telephone executes, preferably out of the removable memory unit, any version of the method according to the invention as described herein. Another embodiment of the invention is a mobile telephone comprising a central processing unit, a memory unit, and at least one display, which mobile telephone has downloaded the method according to any version of the method according to the invention as described herein, into the memory unit. Another embodiment of the invention is a data equipment comprising a central processing unit, a memory unit, and at least one display, such as a personal digital assistance device or a laptop computer, having mobile telephone capabilities or being connected to a mobile telephone, which data equipment executes the method according to any version of the method according to the invention as described herein.

According to the invention a telecommunication system or a data system comprises a first user equipment, a second user equipment, and a communication network to establish a first communication channel between the first user equipment and the second user equipment, and a data object server. The first user equipment is arranged to acquire an address indication, determine the occurance of a triggering event, and assembling a request of an object associated with the address indication. The request comprises parameters suggested in the application to be at least two parameters, a first parameter representing the acquired address indication and a second parameter representing the determined triggering event. Other sets of parameters can also be considered within the scope of the invention. The first user equipment is arranged to optionally encrypt and send the request of an object via a second communication channel to the data object server. The data object server is arranged to return the data object or an indication of the data object in view of the parameters to the first user equipment via the second communication channel in response to the request. The first user equipment is arranged to receive the data object or the indication of the data object from the data object server and to then process the received data object or the indication of the data object.

BRIEF DESCRIPTION OF THE DRAWINGS

The invention will now be more thoroughly described and features and advantages will become readily apparent by reading the following detailed description, where references will be made to the accompanying figures, where.

DETAILED DESCRIPTION

The present invention will now be described with references to a telecommunications system based on GSM as a circuit switched communication system and GPRS as a packet switched communications system. It should however be noted that the embodiments described are to be considered exemplary and that other packet and/or circuit switched systems may equally well be considered for both data and voice communication. Voice communication, email communication, fax access, and HTTP downloading can be transported over circuit switched as well as packet switched systems. Both fixed as well as mobile circuit and packet switched systems with any suitable access technology, e.g., Time Division Multiple Access (TDMA), Code Division Multiple Access (CDMA), Frequency Division Multiple Access (FDMA), Orthogonal Frequency Division Multiple Access (OFDMA), Time Division Duplex (TDD), Frequency Division Duplex (FDD) or any combinations thereof can be used. The invention is not restricted to any specific type of communications network or access technology. The desired communication to be set-up can be either voice or data, e.g. to a facsimile or a data access to an IPv6 addressable device such as a thermostat. An A-party and a B-party can, for example, access and be accessed by a telephone number, an email address, an IPv4 address, a sip address, or an IPv6 address.

Figure 1:
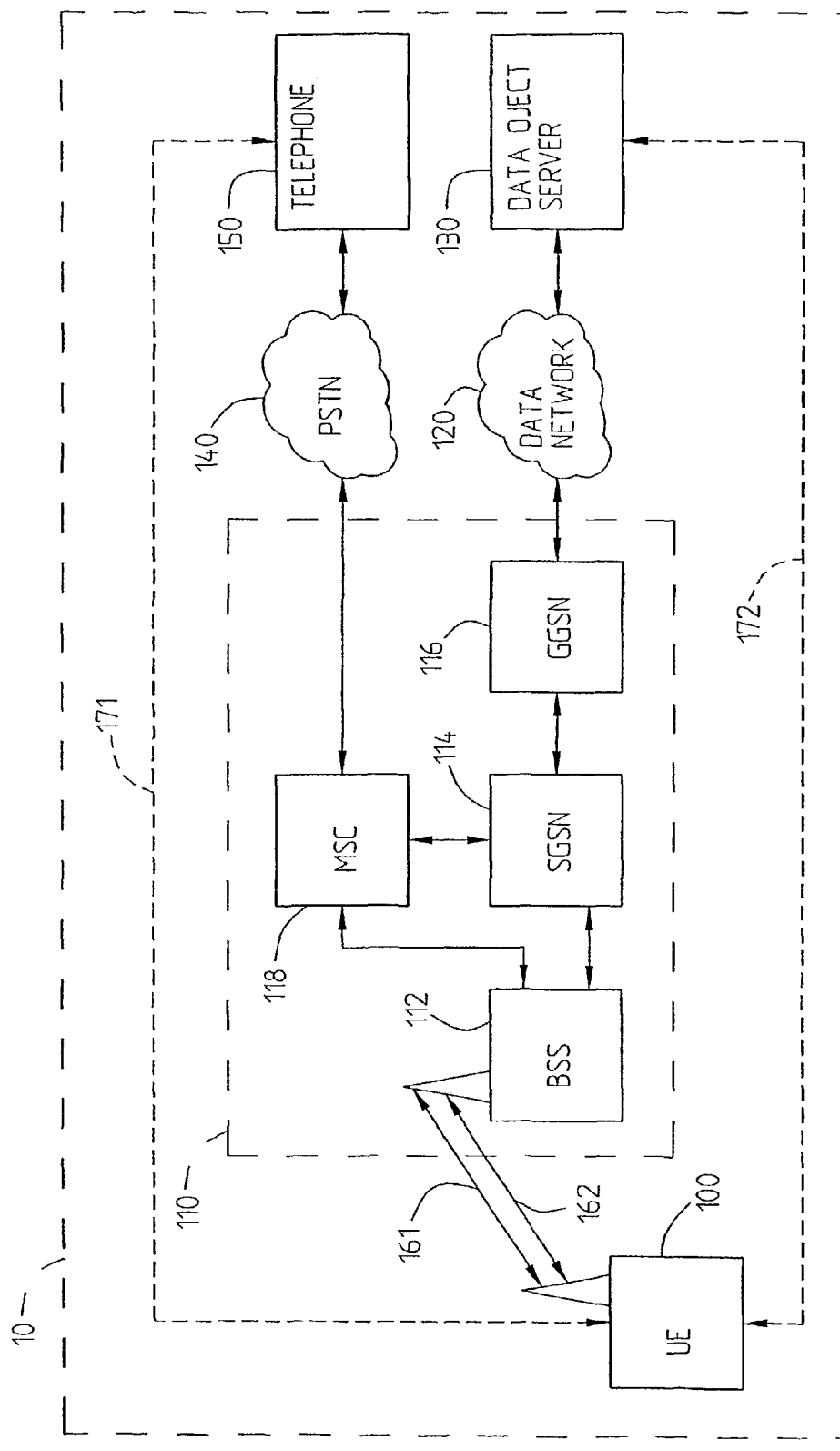
FIG. 1 illustrates an overview of a communication infrastructure overview according to one embodiment of the invention.

FIG. 1 illustrates a communication infrastructure overview, 10, where a number of different communication networks are interconnected. FIG. 1 includes both nodes included in a Circuit Switched (CS) mobile communication network, e.g., a Mobile Switching Center (MSC), 118, and Base Station Subsystem (BSS), 112, as well as nodes included in a Packet Switched (PS) mobile communication network, e.g, Serving GPRS Support Node (SGSN), 114 and a Gateway GPRS Support Node (GGSN), 116. Typically, the SGSN includes functionality such as re-segmenting data packets according to one protocol into data packets according to protocols used over the air interface. The SGSN also includes control mechanisms for one or several BSS, 112 as well as Quality of Service (QoS) mechanisms. The GGSN include functionality required to maintain communication between a mobile packet data network and other packet data networks e.g., data network 120. The CS part of the network connects to a PSTN network, 140, and the PS part of the network connects to a data network, 120. The data network may be both an external or internal network, i.e., with global or limited access possibilities. As shown, the PS and CS parts of the network may also be interconnected by way of an interface between the MSC, 118 and the SGSN, 114. The BSS, 112, may serve both the PS as well as the CS part of the network with packet switched (161) as well as circuit switched (162) communication resources over the air, to provide mobility to both PS and CS service users and their User Equipment (UE), 100. The UE, 100, may for example be a mobile telephone or a mobile telephone connected to any kind of data equipment, e.g., Personal Digital Assistance Devices (PDA) or Laptop computer The PSTN, 140, provide users (user devices) connected to the fixed network with service, e.g., to "plain old telephones" (POTs), facsimile- or data modem devices, 150. Other examples of devices connected directly or indirectly to the PSTN, 140, are ISDN terminals and communication devices connected via a Digital Subscriber line (DSL)—(e.g. ADSL, HDSL and XDSL).

The data network, 120, typically includes one or several routers (not illustrated) and data bridges such that several nodes may be interconnected and communicate with each other. The data network used in connection with the present invention also includes a data object server, 130. Typically, a plurality of data object servers are included in a data network, although, for reasons of explanation and clarity, only one data object server, 130, is illustrated in FIG. 1. In a preferred embodiment the functionality of a data object server 130 is divided into two logically different parts, a name server and an object server. A name server and an object server might be physically separated or just logically separated. The name server provides translation between address indications such as telephone numbers, events and an appropriate location of an object server where desired objects, phonepages, reside, e.g. URIs (Universal Resource Identifiers) for example URLs (Universal Resource Locators). An object server hosts the desired objects, the content of the phonepages. Several name servers might be provided, for example a specific name server might be operated by a mobile telephone network operator or a vendor of a mobile telephone. The particular embodiment of a user equipment will determine which name server is used. The name server can be given by the service provider used, can be based on country, be a general global, be dependent on service (such as email), or a combination. In a preferred embodiment a user equipment associated with a specific network operator by means of e.g. a SIM card, will automatically send a request to a name server hosted by the network operator. By automatically, as preprogrammed in e.g. a SIM card, direct a request of a user equipment to a name server hosted by the user's designated network operator (e.g. determined by a SIM card), several advantages such as related to security, speed and redundancy, can be obtained.

Examples of data networks are Internet and Intranet networks. The UE, 100, may obtain a complete logical connection 171 to an indicated B-party telephone, 150, connected to the PSIN, 140, through the CS communication channel, 161, provided between the UE, 100, and the BSS, 112, and further via the MSC node, 118, over which conversation may be conducted between either party UE 100 and telephone 150. Similarly, the UE, 100, may obtain a complete logical connection 172 to equipment, e.g., data object server, 130, connected to the data network, 120, through the PS communication channel, 162, provided between the UE, 100 and the BSS, 112, and further via the SGSN-, 114 and GGSN, 116, node, over which data may be sent between either party UE 100 and data object server 130.

According to one aspect of the present invention a data object server, 130, includes graphical information objects, i.e., phonepages, associated to an address indication such as a telephone number, or an internet address such as an IPv6 address. The telephone number is identical to a subscriber number, i.e., an A- or B number, addressing an originating user equipment or a terminating user equipment, respectively. The A-party, upon dialing a B-number, connects to a data object server, 130, by way of PS communication channel and receives a data object, i.e., a "phonepage" stored in a memory position in the data object server, with a memory address corresponding to the B-number dialed. The data object server may comprise the phonepage with information about the B-party directly, or it may simply provide an immediate access to a location in an internal or external data network as maintained by the B-party subscriber, i.e. the object server 130 first functions as a number server providing a translation of the provided B-number to a corresponding URI where the phonepage resides, which may be at a physically separated phonepage object server. The translation and provision of the actual requested phonepage can be either transparent, i.e. the phonepage number server forwards, or dispatches, the phonepage request to an appropriate phonepage object server, which phonepage object server communicates directly, or indirectly via the name server, to the requester, or the phonepage number server returns the URI of the requested phonepage to the requester after which the requester will be redirected by using the URI to request the desired phonepage.

The B-party phonepage may comprise information regarding a B-party user, e.g., phone number, address and/or other information. The B-party phonepage may also comprise information regarding the addressed B-party's user equipment, which, for example, can be a fax. After having received the B-party phonepage, one or several procedures may follow. If the B-number is addressing a POT, 150, a circuit switched voice connection may be setup. If the B-number is addressing another device, other events, such as when a pay-service is used, may occur. This is of course also dependent upon the A-party device, UE, 100, used.

According to another aspect of the present invention a phonepage can be associated with an internet address such as an IPv6 address, sip address or an email address. For example, an A-party, upon setting up a communication link with a web-page to a thermostat of his or her summer house to thereby control/check the temperature, will receive a data object which, for example, identifies the thermostat and comprises a link to the manufacturers home page, and/or other communication means to the manufacturer. In another example, an A-party desires to set up a conference call by means of a conference telephone located in a conference room. Upon initiation of the communication, the A-party will receive a data object which is linked to the conference telephone by means of its telephone number, http address or IP address. The data object, the conference telephone's phonepage, can suitably comprise information concerning the locality of the conference phone, the size of the conference room, and/or a booking schedule. In still another example, an A-party desires to transfer a facsimile. Upon choosing or initiating transmission to a fax-machine, the phonepage of the fax machine is requested and returned to the A-party. A phonepage of a fax machine might comprise information concerning the locality of the fax, whose fax machine it is, and/or who has access to the fax machine. In still a further example, an A-party desires to transfer an email to a B-party. Then, upon choosing or writing the email address, i.e. perhaps even before a message is composed, the phonepage of the email address is requested and returned to the A-party. A phonepage of an email address might comprise information concerning the owner, the B-party user, of the email address, other means of communication with the owner, and/or schedule or availability of the owner. A phonepage is a data object that is linked to a unique identifier such as a telephone number or an internet address such as an IPv6 address, but not located or retrieved from the place that the unique identifier identifies.

In a variant of the present invention, the UE, 100, does not support the use of a PS communication channel whereby data objects can be retrieved by other means, such as a Short Message Service (SMS) or a temporary CS communication channel. The data objects retrieved can in some cases be just the URIs to a desired phonepage which is presented by means of a SMS. In cases when the reception of a SMS is used as a triggering event, the user equipment can scan the incomming SMS, and if any URI is found, then start a browser with the received URI. In a variant of the present invention, a PS communication channel, for example having a particular QoS, is used for conveying speech within the communication system 10 whereby the PSTN, 140, and the data network, 120, is interconnected by some means (not shown in FIG. 1).

Figure 2:
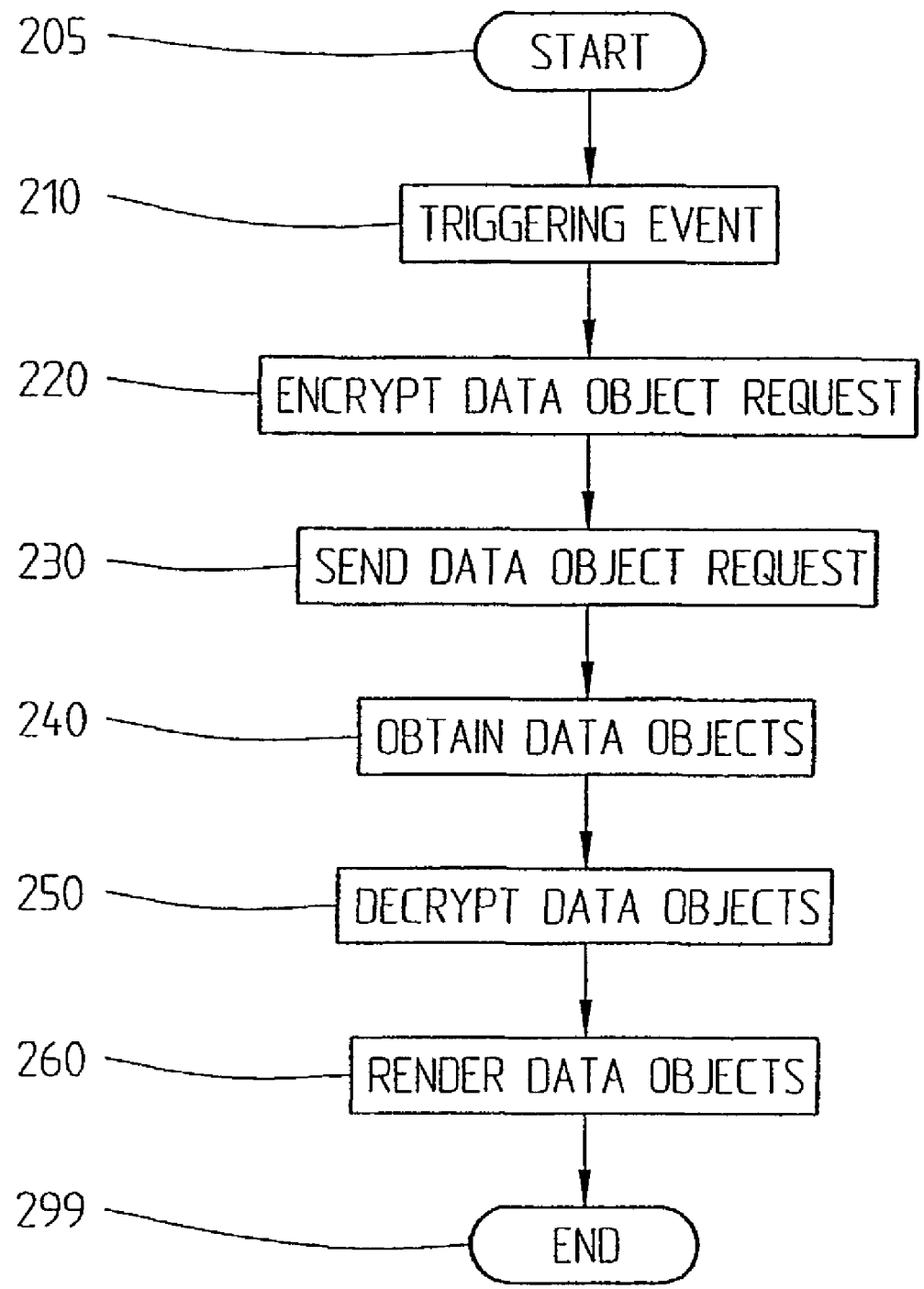
FIG. 2 illustrates a first flow diagram of a subscriber interaction in an A-party UE according to one embodiment of the present invention.

FIG. 2 illustrates a flow diagram of a procedure in an originating UE (like the UE, 100) for communicating a phonepage to an A-party using the UE, according to one embodiment of the present invention. In step 205, the procedure starts by an initiation from the A-party, (e.g. a UE is switched on). In step 210, a trigger of a phonepage request is indicated, either automatically (e.g. a call is terminated by the other party) or manually by the A-party (e.g., the dialing of a B-number or choosing an email address). A manual request is especially suitable when a phone page of a address indication which is last called, missed, or last received, i.e. a phonepage associated with, for example, a number stored in the user equipment. The phonepages can have been stored in association with the appropriate number within the user equipment for a true offline session, or be retrieved on demand. The triggering event, 210, may be at least one of a number of events, e.g.;

A call is conducted under which several triggering events can be generated, to thereby generate a flow of phone pages.
An outgoing call is or is about to be initiated.
An outgoing communication link is or is about to be initiated.
An address indication is specified.
A data communication is or is about to be initiated.
A fax is or is about to be transmitted.
An addressed B-party answers a call.
An addressed B-party is busy.
An addressed B-party does not answer.
An addressed B-party rejects a call.
An addressed B-party is unavailable (e.g. an addressed mobile phone is out of coverage).
An incoming call is imminent or has just started.
A conference call is or is about to be initiated.
A call is disconnected.
A subscriber is put on hold.
A UE is about to be switched off.
A UE has been switched on.
When a designated button on a UE is pressed.
In response to a talk spurt received by a UE.
A voice mail has been left to a subscriber.
An SMS has been or is about to be sent to a subscriber.
An SMS has been or is about to be received from a subscriber.
An email has been or is about to be sent to a subscriber.
An email has been or is about to be received from a subscriber.
A HTTP download is or is about to be initiated.
A chat session is or is about to be initiated.
A managed data object (SNMP) is or is about to be accessed.

Certain triggering events may provide special services by for example a network operator or automatically provide information or advertisement relating to a location. These triggering events may be one or more of.

A new cell in the PLMN has been selected.
The location of a subscriber has changed. Local advertisement can be provided, such as a nearest fast food chain restaurant.
A new Public Land Mobile Network (PLMN) operator is selected. This, for example, enables a pricelist of the selected PLMN operator to be presented.
A new country of registration is made. This triggering event can be used to supply one or more phonepages concerning the new country.

As mentioned, several triggering events during a call can generate requests for phonepages. There can be a greeting phonepage which is used before voice or other communication is commenced, one or more phonepages (which may be pushed, i.e. ordered/sent by the other party) during the conversation/communication and a final goodbye phonepage in connection with termination of the voice or data communication. All the phonepages can be retrieved before the voice or data communication commences and cached in respective user equipment, both on the originating and terminating side. Caching of phonepages in the respective user equipment is especially suitable if one or both of the user equipment does not support simultaneous voice and data communication.

The A-party initiates a request in step 230, possibly after encryption in step 220, and sends this request via a communication channel, (e.g., packet switched as illustrated in FIG. 1) to a data object server. The data object request may include at least one of a number of different parameters, e.g.;

A code indicating home operator.
A code indicating data bearer type.
A code indicating the vendor, i.e. brand/manufacturer, of the user equipment, e.g. Nokia.
A code indicating the type of the user equipment, e.g 7110, a fax, a thermostat.
One or more codes indicating available and/or attached accessories such as a handsfree set, a chatboard, an mp3 player, a radio, a barcode reader, a PDA, and/or any blue tooth equipment.
A code indicating if an accessory, eg. a handsfree accessory, such as a headset or a car handsfree set, is active or not. An active handsfree headset will preferably entail an audio phonepage presentation.
A code indicating software versions of the user equipment.
A requested protocol to be used for transmission (e.g., WAP, WML, HDML, HTML, HTTP).
An identification of a data object server (e.g. a server name or a plain IP address).
A code denoting what kind of event that triggered the data object request (e.g. outgoing call setup).
The indicated B-number or other unique identifier associated to at least one B-party equipment.
An A-party identity, e.g., an A-number of a mobile station or a subscription identity, e.g. IMSI (International Mobile Subscriber Identity).
A network address of the A-party (e.g. IP address) used by the data object server when returning a requested data object.

A capability code indicating the rendering capabilities of the A-party (e.g. screen resolution, audio etc.).

A code indicating an encryption scheme and/or encryption key used.

A code indicating in what country the mobile station is registered (country code).

A code identifying the current PLMN (V-PLMN) operator or the PLMN where the A-party has a subscription (H-PLMN) or both.

A code indicating an equipment unique identity.

A validation code (e.g. a checksum) of the parameters.

The data object request in 230 may, according to a variant of the invention, be answered by the data object server in an encrypted format, in which case a decryption in step 250 follows the reception of the response, at step 240, in the user equipment.

If the data objects received at step 240 comprise one or more phonepages then in the next step follows a rendering procedure in step 260, where the data objects are displayed and/or voiced according to the capability of the UE after which the procedure is ended in step 299. As an example, if a handsfree equipment of a recipient user equipment is active, then it is suitable to at least use the audio interface as a complement to any displayed information. A phonepage can comprise information and functionality for updating a phone book in the recipient user equipment or SIM card. Suitably any updating is only done after acceptance of the recipient. According to one embodiment of the invention, the first time a call is made to or received from someone who does not exist in a phonebook of the user equipment, then upon reception of a phonepage comprising name and other information, an inquiry is put to a user of the user equipment whether an entry with one or more parts of the information received should be added to the phonebook.

Typically after step 299, there will follow one or several procedures according to the capability of the A-party UE or the type of equipment addressed by a B-number or other address indication.

According to one of the above mentioned embodiments, where a continues triggering event is that a call is conducted, special advantages may be relevant, e.g. commercial information may be sold in response to a dialed B-number allowing easy payment for information received by means of a phonepage. Single issues of a magazine can be sold by calling a pay-number, the originators phonepage giving the name and address to send the magazine. Information that is retrivable by means of a password or the like can be sold by calling a pay-number and receiving a phonepage in return with any paid-for password or the like, suitably when the call is terminated or is ongoing.

Figure 3:
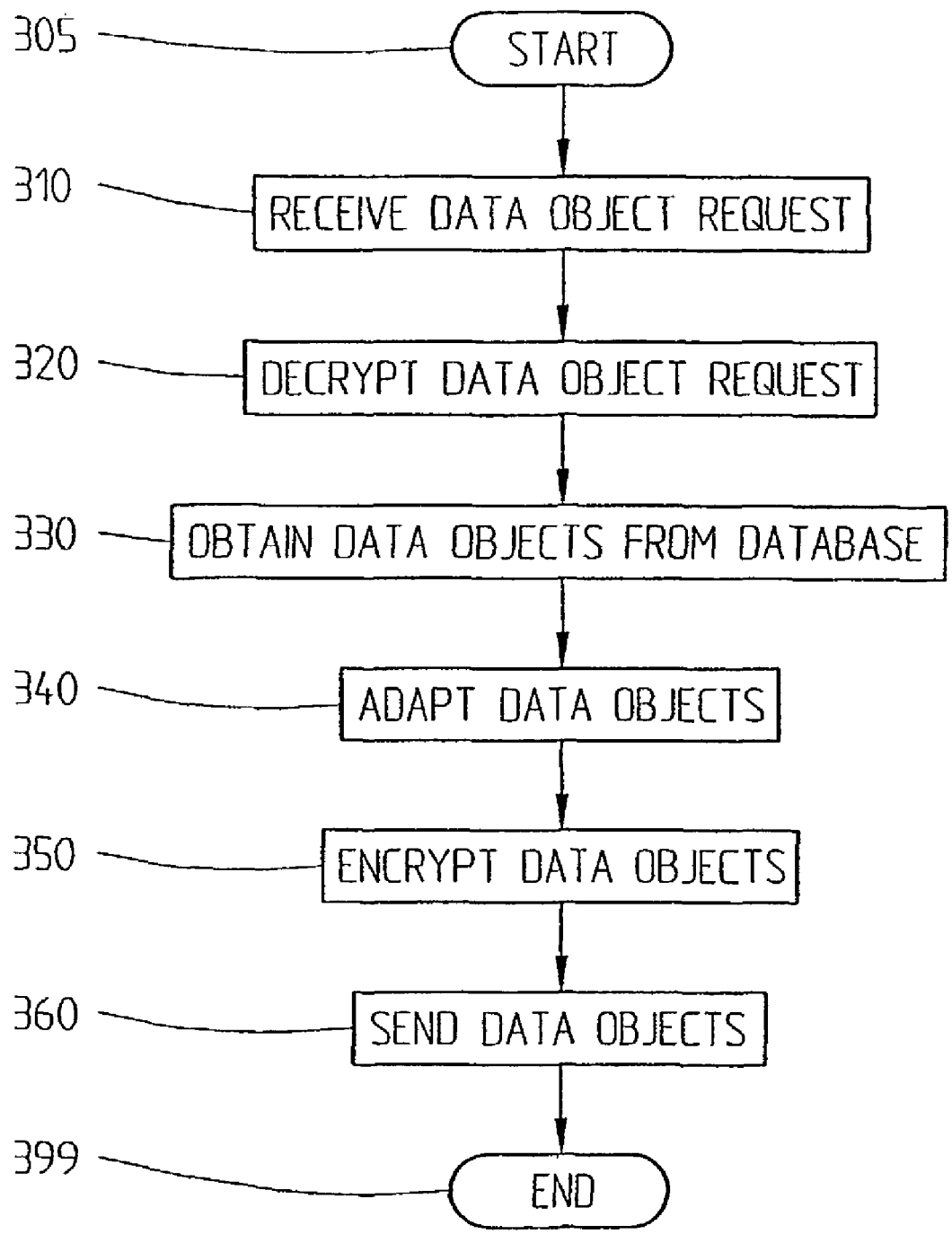
FIG. 3 illustrates a first flow diagram of a subscriber interaction in a data server according to one embodiment of the present invention.

FIG. 3 illustrates the corresponding procedures in a data object server (like the data object server 130), wherein, in step 305, the procedure starts and in step 310, the data object server receives a request for a data object. The request may typically include at least an address indication corresponding to for example an A- or B-number, email address, or IPv6 address, and what kind of action that triggered the request. If the request is encrypted, decryption will be made in step 320, before interpreting the content. The address indication (e.g. A- or B-number) in the request received in step 310 will be mapped with a memory address in the data object server, or to an address in a, to the data object server, connected memory in another server and the data object, e.g. a phonepage, will be retrieved in step 330. As mentioned previously, the data object server can either provide a phonepage directly or just a pointer to a phonepage, the pointer suitably being a URI. In some embodiments when the data object server does not comprise the phonepages itself, the data object server will forward, i.e. dispatch, the request to the actual phonepage server or provide the requester with the URI to the phonepage. A dispatch can be described as:

A user equipment sends a request for a phonepage to the data object server;

The data object server forwards the request, with all appropriate parameters, to an actual phonepage server;

The actual phonepage server transfers the requested phonepage to the user equipment.

A redirect can be described as

A user equipment sends a request for a phonepage to the data object server;

The data object server returns a URI of an actual phonepage server to the user equipment;

The user equipment makes a new request to the actual phonepage server using the supplied URI;

The actual phonepage server transfers either directly or indirectly (e.g. via the name server) the requested phonepage to the user equipment.

The request in step 310 may also include an indication of a UE display capability, in which case the data object may be adapted in the data object server to a specific rendering capability, step 340, of a receiving UE. The request in step 310 may also include an indication of an identity, e.g. a telephone number, of the requester, in which case a returned phonepage or phonepages can be from a selection of phonepages in dependence of the identity of the requester. If the request was encrypted, or if requested for some other reason, the data object will be encrypted in step 350 before it is returned to the requesting UE, in step 360 and then the procedure is ended in the data object server in step 699.

The above described general solution to obtain a data object connected to an address indication may of course be varied in a number of different ways, depending on, e.g., the capabilities of communication of the UEs involved. For example, a method of simultaneously requesting, encrypting, obtaining, decrypting and rendering a sequence of data objects can also be applied in a variant of the present invention.

User equipment, like mobile stations, are today developed to handle both packet switched and circuit switched communication simultaneously. These are generally referred to as class A mobile stations. Other mobile station design allows packet switched and circuit switched communication alternatively, i.e., no simultaneous PS and CS transmission and reception. These are generally referred to as class B mobile stations.

Figure 4:
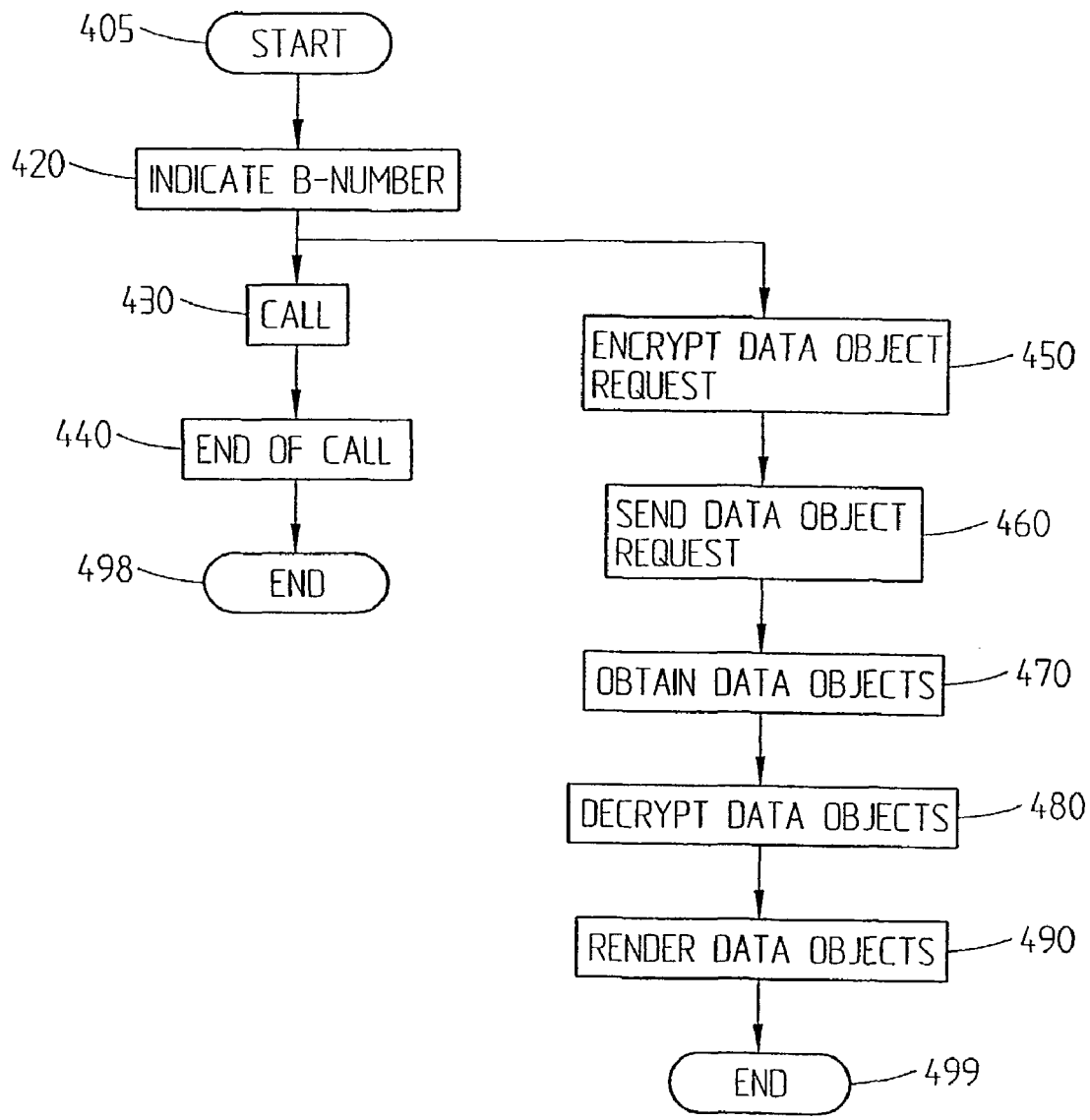
FIG. 4 illustrates a second flow diagram of a subscriber interaction in an A-party UE according to an embodiment of the present invention, when data and voice communications can be conducted simultaneously.

In FIG. 4 is illustrated a flow diagram of procedures included when a circuit switched connection is initiated from a UE which is a class A mobile station according to one aspect of the present invention. In step 405, the procedure is started when a class A mobile station is not involved in a call session and when a user, e.g., starts to indicate a B-number to a B-party, step 420, by pressing a digit, a button or by activating voice recognition means. During step 420 the entire B-number is obtained. The mobile station now start to set up two different connections, a circuit switched connection for a voice communication channel in step 430-440-498, and a packet switched communication channel for retrieval of a phonepage in step 450-499. These procedures may in a class A mobile station be simultaneous.

For the circuit switched procedures, a voice connection with a B-party is initiated in step 430, a communication resource is assigned by a mobile network over which a telephone conversation may take place. The telephone conversation is ended in step 440 as any ordinary voice call, for example by pressing a designated button on the mobile station or hanging up a handheld part of a fixed network telephone. Ending the call also involves de-allocation of relevant communication resources within the circuit switched part of the mobile communication network as well as e.g., any PSTN resources involved in the connection.

The packet switched procedures basically follow the procedures described in connection to FIG. 3, where a data object request is sent, possibly after encryption, steps 450 and 460 and a response is received and the phonepage displayed, possibly after proper decryption thereof, steps 470-490, after which the packet switched connection also ends, in step 499.

Figure 5:
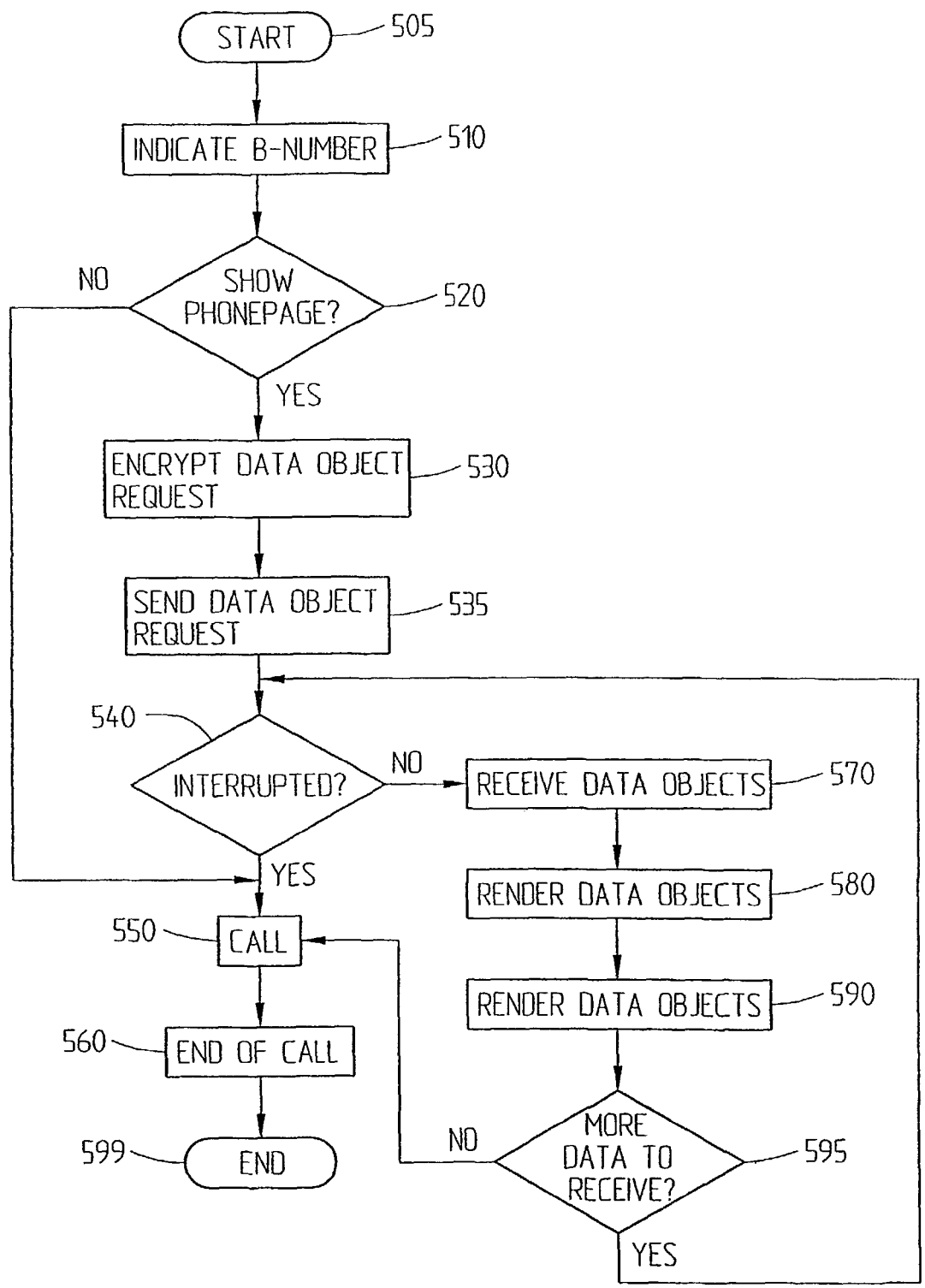
FIG. 5 illustrates a third flow diagram of a subscriber interaction in an A-party UE according to another embodiment of the present invention, when data and voice communications can not be conducted simultaneously.

As mentioned above, a class B type mobile station cannot handle two simultaneous connections, one packet and one circuit switched, so for some events another approach to retrieve a phonepage is then necessary when setting up a circuit switched voice connection FIG. 5 illustrates a similar procedure to that explained with reference to FIG. 4, but with a mobile station of a class B type used in the A-party, call originating end. In step 505 the procedure starts and in step 510, the B-number is indicated as described above in reference to FIG. 4. In this embodiment, a step 520 is introduced where it is possible to select if a phonepage is to be requested or not. This can typically be a selection made by the user, and/or indicated by the B-number dialed by appropriate setting. According to one embodiment of the current invention double clicking on a designated SEND button indicates that the phone page is to be requested. If it is indicated that a phonepage is not desired, then follows in step 550-560 and 599 a circuit switched call connection and termination as explained in relation to FIG. 4, steps 430, 440 and 498.

If it is indicated that a phonepage is desired, then the following steps are to encrypt, 530, and send, 535, a data object request on a packet switched communication channel. As long as the packet session is not interrupted, 540, the download of data object continues to the A-party. Data objects are received in step 570, decrypted, if encrypted, in step 580 and rendered in step 590. In step 595 the data objects are detected and as long as there is more information to receive, step 595, and there is no interruptions in step 540, the data download continues. A possible interrupt may occur, e.g., when a user wishes to no longer wait for a complete download of a phonepage and instead initiates the circuit switched communication in step 550. This may be initiated by a time expiring or by manually indicating on a man-machine interface (MMI). At the latest, the circuit switched communication is initiated when there is no more phonepage data to download. According to another embodiment of the present invention the phonepages for a class B UE is obtained from the data object server, 130, upon call completion or whenever the UE is not involved in a call, and is stored locally in the UE being readily available upon a next triggering event.

Figure 6:
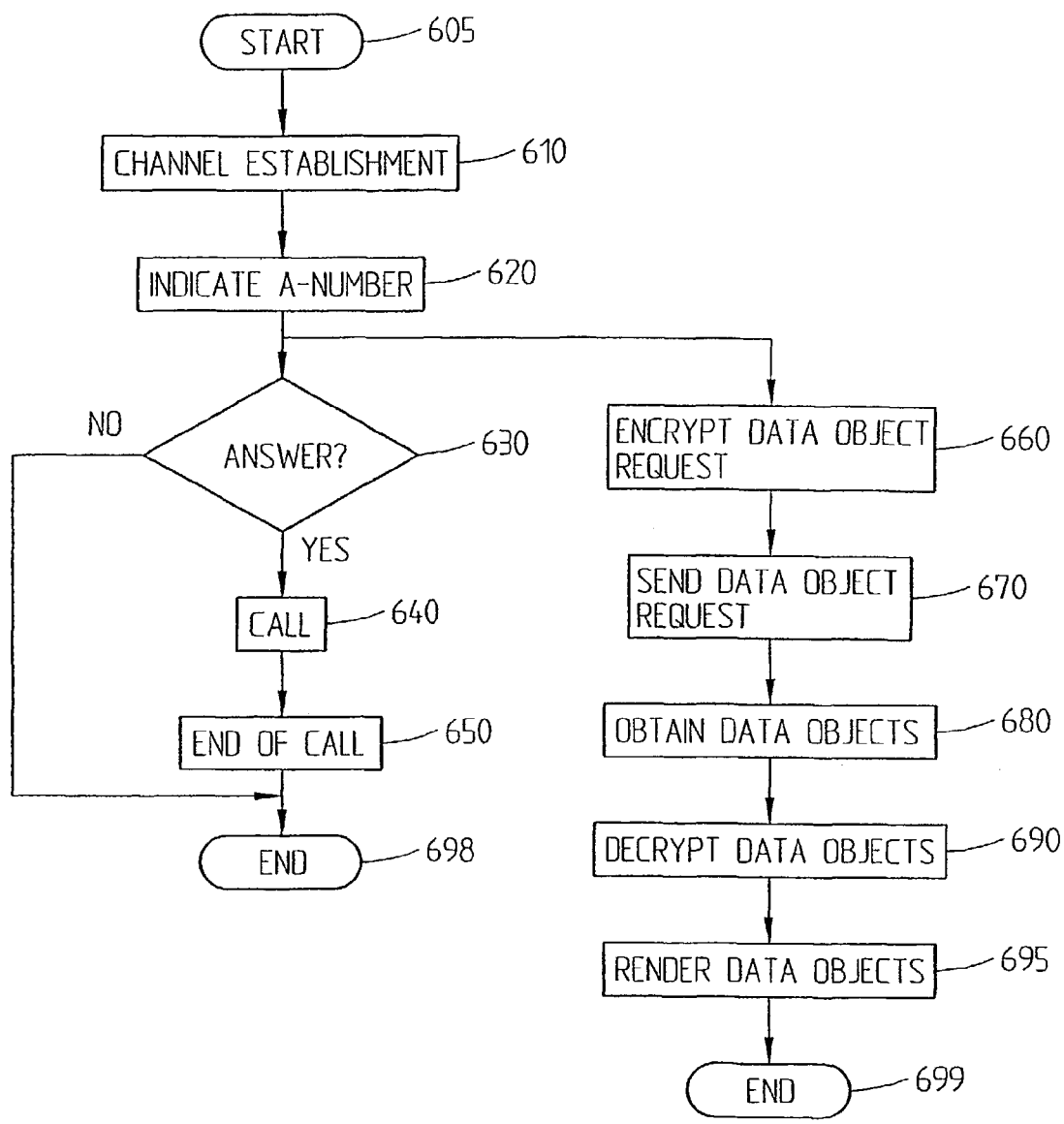
FIG. 6 illustrates a flow diagram of a subscriber interaction in a B-party UE according to an embodiment of the present invention.

So far, the retrieval of phonepages to display in an A-party equipment has been addressed. It should be recognized that a B-party may similarly also display a phonepage related to a connection, preferably a phonepage identified with the A-party number. In FIG. 6 is illustrated a flow diagram of the procedures in a B-party user equipment for retrieval of A-party phonepages according to one embodiment of the present invention when the B-party has the capabilities corresponding to that of a class A mobile station. The procedure start in step 605, e.g., by an incoming call to a B-party UE. In step 610 a communication channel is allocated between the UE and the network, 110, it is connected to. In step 620 an indication of the call originating identity, i.e., the A-party identity, preferably, an A number, is revealed to the B-party.

Then in step 660 and 670, a request is sent, subsequent to encryption thereof, to a data object server. The request is, when received in the server, treated similar as the requests received from the A party, i.e., decrypted if necessary, and responded to in transmission of a data object related to the A-party identity. The UE receives the data objects, i.e., phonepage in step 680 and after decryption in step 690, if necessary, the phonepage can be displayed to the B-party user in step 695. A greeting phonepage received by a B-party in a terminating user equipment which has been requested in response to an incomming call being imminent triggering event can comprise a personalized call signal of the originator, the A-party, i.e. a caller, an A-party, identifies him- or herself to a B-party by means of special call signal in the B-party user equipment. In one version of the invention a sound in a phonepage can replace a call signal sound, preferably only temporary for the duration of the call or call setup, to thereby use the phonepage sound as a call signal. In another version the call signal of a phonepage recipient is muted, preferably only for the duration of the call, to thereby enable only a sound of a phonepage to be heard instead of the normal call signal.

If the call is answered in 630, the voice connection may follow the same procedures as those described in relation to FIGS. 3 and 4. If the call is not answered the voice part sequence ends in 698.

For reasons of clarification, several steps in the signaling between the UE 100 and the communication infrastructure 110; between the UE 100 and the data object server 130; have been omitted, in several embodiments above, and focus has been put on the necessary and novel steps according to the invention, in the aforementioned signaling. It should be understood that other procedures (e.g. authentication, channel assignment and charging) might occur in addition to what has been described in the aforementioned signaling.

Figure 7:
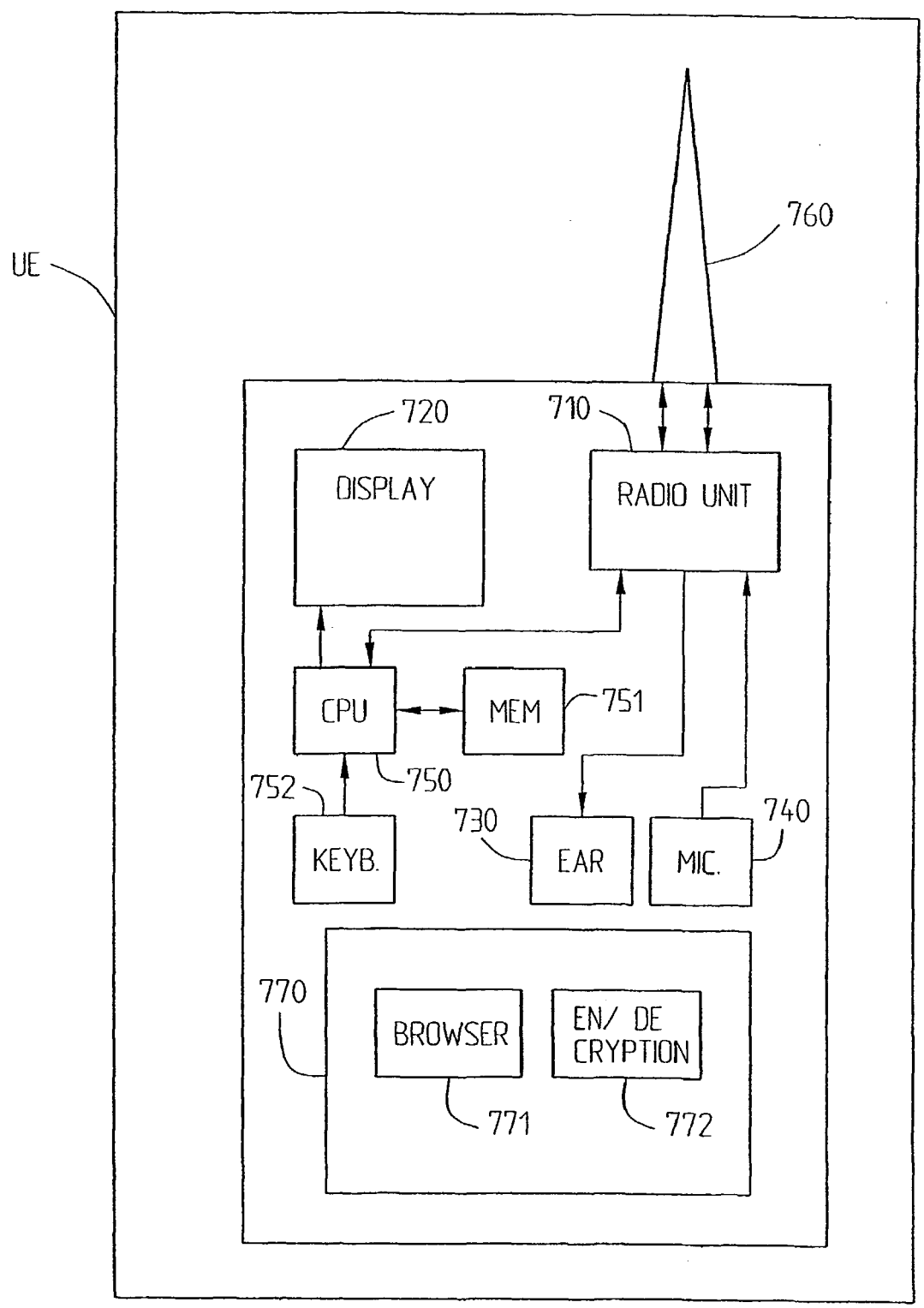
FIG. 7 illustrates an exemplary block diagram of a UE according to one embodiment of the invention.

FIG. 7 illustrates a UE according to be used in one embodiment of the present invention, where the UE is a mobile telephone or a PDA with mobile telephone capabilities. A Central Processing Unit (hereafter CPU) 750 is connected to at least one memory unit 751, and at least one display 720. The CPU 750 may also be connected to a keyboard device or area 752 to allow subscribers to enter for example digits. The memory unit 751 may be non-volatile (e.g. EEPROM or SIM card) in order to retain stored information, should power be temporarily unavailable. The CPU 750 is further connected to a radio unit 710 that may convert incoming and out going data to RE modulated signals. The radio unit 710 also connects to an antenna 760 allowing the RF modulated signals to be received/transmitted to an RF compatible media (e.g. air). The radio unit 710 may also directly or indirectly be connected to an earphone 730 and a microphone 740 in order to allow voice communication. The UE may further comprise a plurality of programs, e.g., a browser, 771, that can render at least one type of data object and an encryption/decryption engine 772 allowing data object requests to be encrypted and data objects to be decrypted. The UE may optionally be equipped with a cache memory in which it is possible to store and retrieve data objects without occupying transmission resources within the communication network 10.

Figure 8:
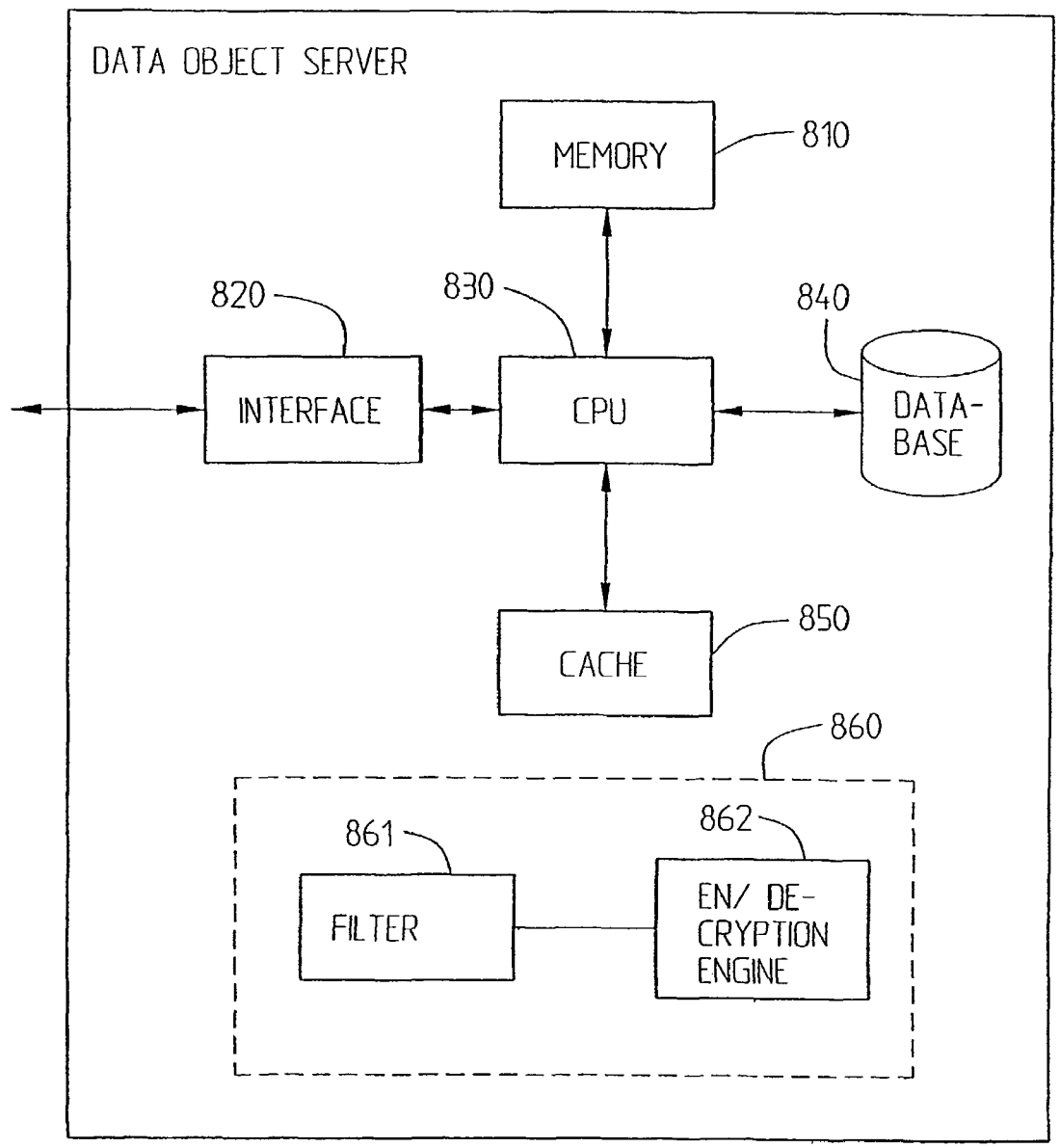
FIG. 8 illustrates a block diagram of a data object server in a data network according to one embodiment of the invention.

FIG. 8 illustrates a data object server 130, according to one embodiment of the present invention. The data object server comprises at least one CPU 830 connected to at least one memory device 810, a cache memory 850, at least one database 840 and at least one interface 820. Memory devices 810 and databases 840 may be nonvolatile. The interface 820 enables the CPU 830 to send and receive data to/from the data network 120. The cache memory 850 allows storage of frequently used data object so that the CPU 830 may obtain them readily. The database 840 contains the actual data objects that can be requested by the UE 100 via a communication infrastructure 110 and a data network 120. The data object server may also further comprise a number of programs including, but not limited to, a filter 861 allowing the data objects to be optimized according to the rendering capabilities of the UE 100; and an encryption/decryption engine 862 allowing data object requests to be decrypted and data objects to be encrypted.

According to a variant of the invention the blocks 810, 820, 830, 840, 850 and 860 may be implemented on a plurality of computers. According to another variant of the present invention, the said plurality of computers may be located at a substantial distance.

Figure 9:
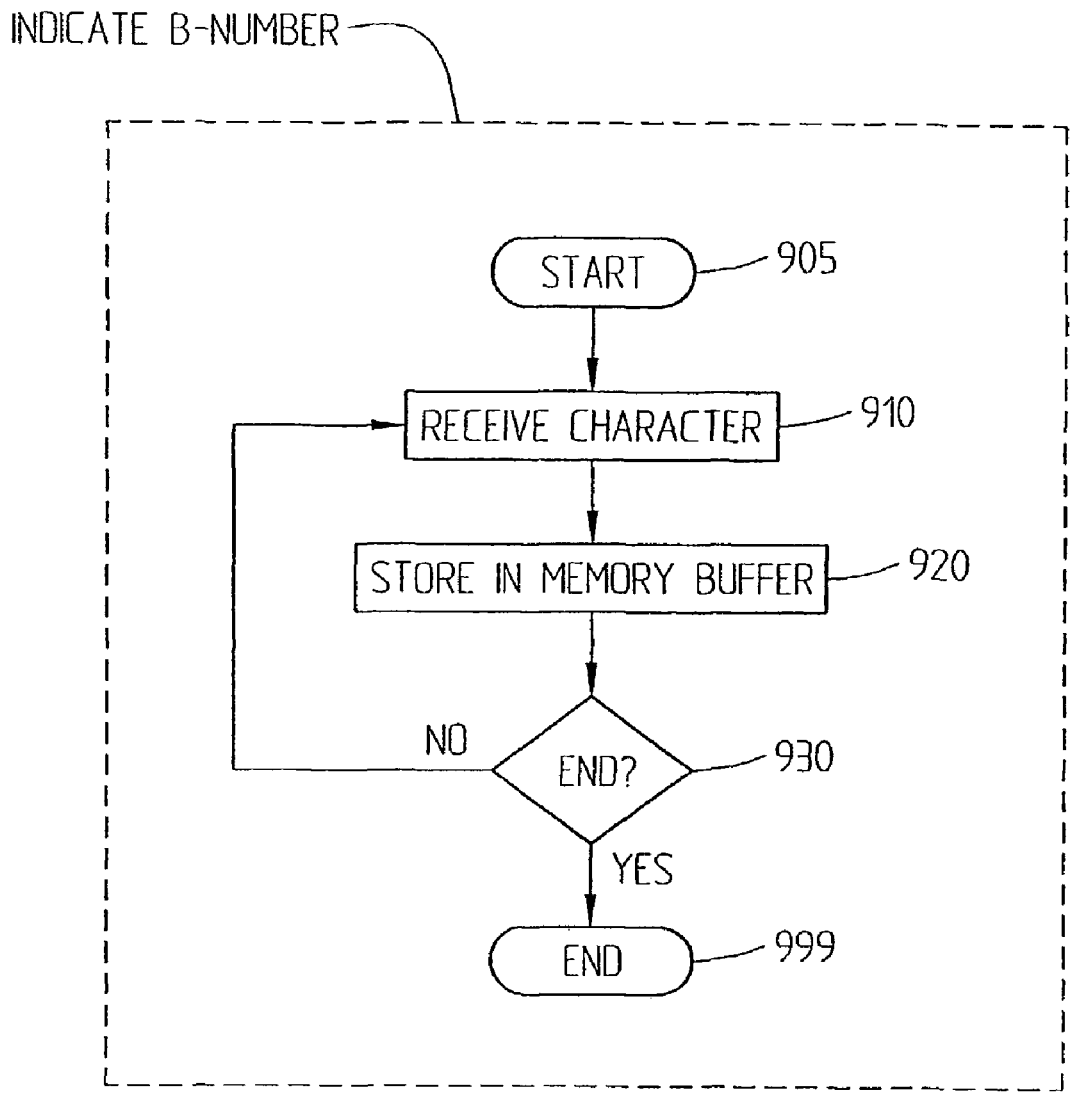
FIG. 9 illustrates a flow diagram of B-number indication procedure according to one embodiment of the present invention.

B-number indication involves any means of indicating a B-number in an A-party UE. A first example of B-number indication procedure is described with reference to FIG. 9 where the B-number indication comprises a start step at 905 and the step 910 of receiving a character from a keyboard arrangement. In response to step 910, storing the character in a memory buffer in the UE in step 920 and checking if the B-number is complete in step 930. If the number is incomplete step 910, 920 and 930 is repeated. If the B-number is complete the B-number indication procedure is concluded in 999. Determination of B-number completion 930 may or may not involve the use of timers supervising the indication procedure; a short key combination in order to minimize the number of keys pressed; designated buttons to indicate number completion (e.g. pressing SEND or CALL buttons once) or by analyzing the digits in the memory buffer for B-number completeness.

A second example of B-number indication is by means of voice detection, whereby an incoming talk spurt is successfully matched with an entry in an internal database contained in a UE 100, whereby a valid B-number could be obtained in response to the aforementioned talk spurt.

Figure 10:
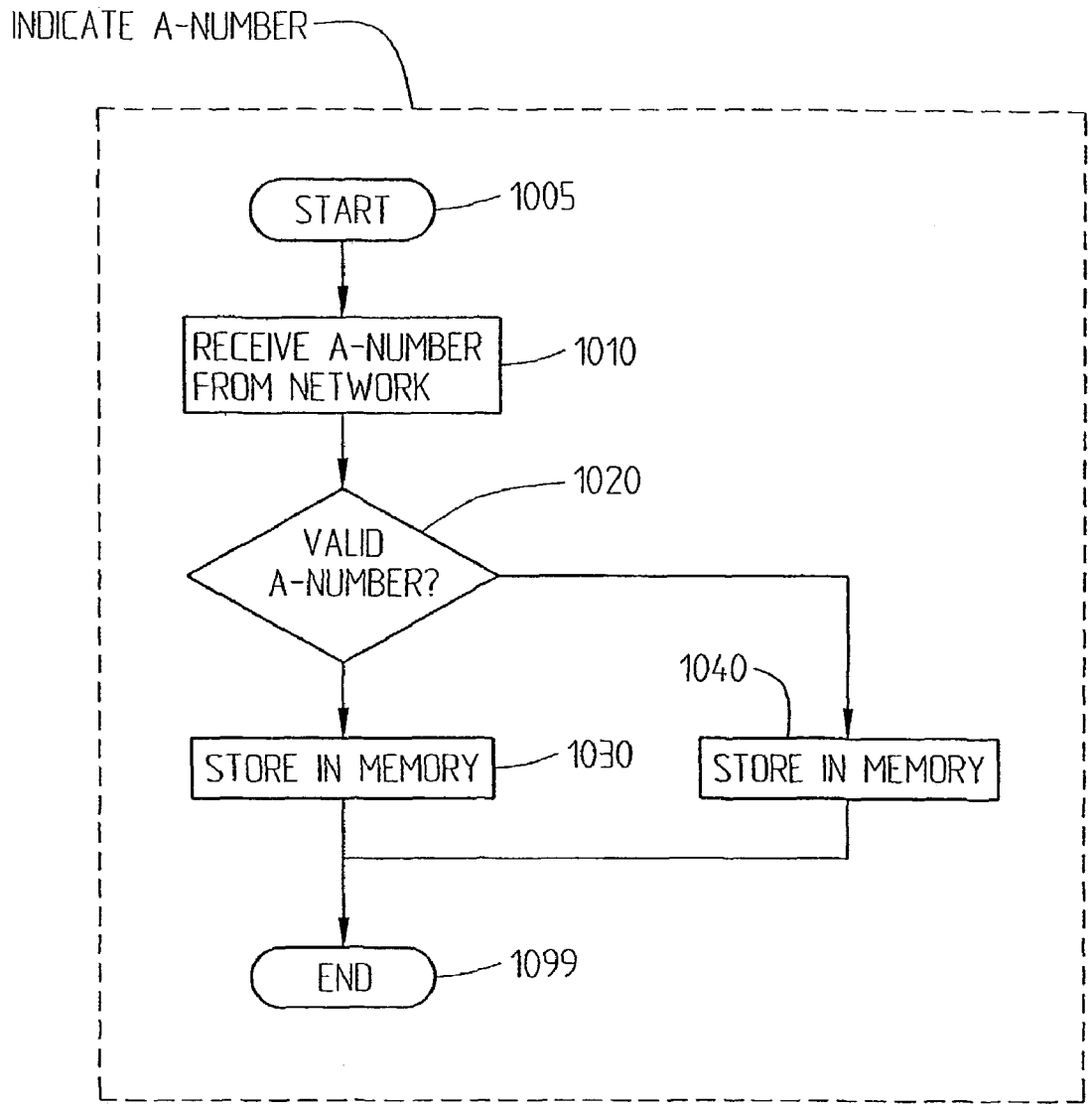
FIG. 10 illustrates a flow diagram of A-number indication procedure according to one embodiment of the present invention.

A-number indication involves any means of indicating an A-number to a said UE 100. A first example of A-number indication procedure is described with reference to FIG. 10 where the A-number indication comprises the step 1005 of starting the procedure and 1010 of receiving an A-number from a communication infrastructure 110. In response to step 1010 checking if the A-number was valid (e.g. not blocked, secret or misinterpreted) and if it was valid, storing the A-number in a memory in the UA 100 in step 1030. If the A-number was not valid a flag indicating a non valid A-number is stored in a memory of UE 100. The procedure is ended in 1099.

A second example of A-number indication is by means of sending an A-number or data objects in response to an A-number directly on a logical data communication link 162.

Figure 11:
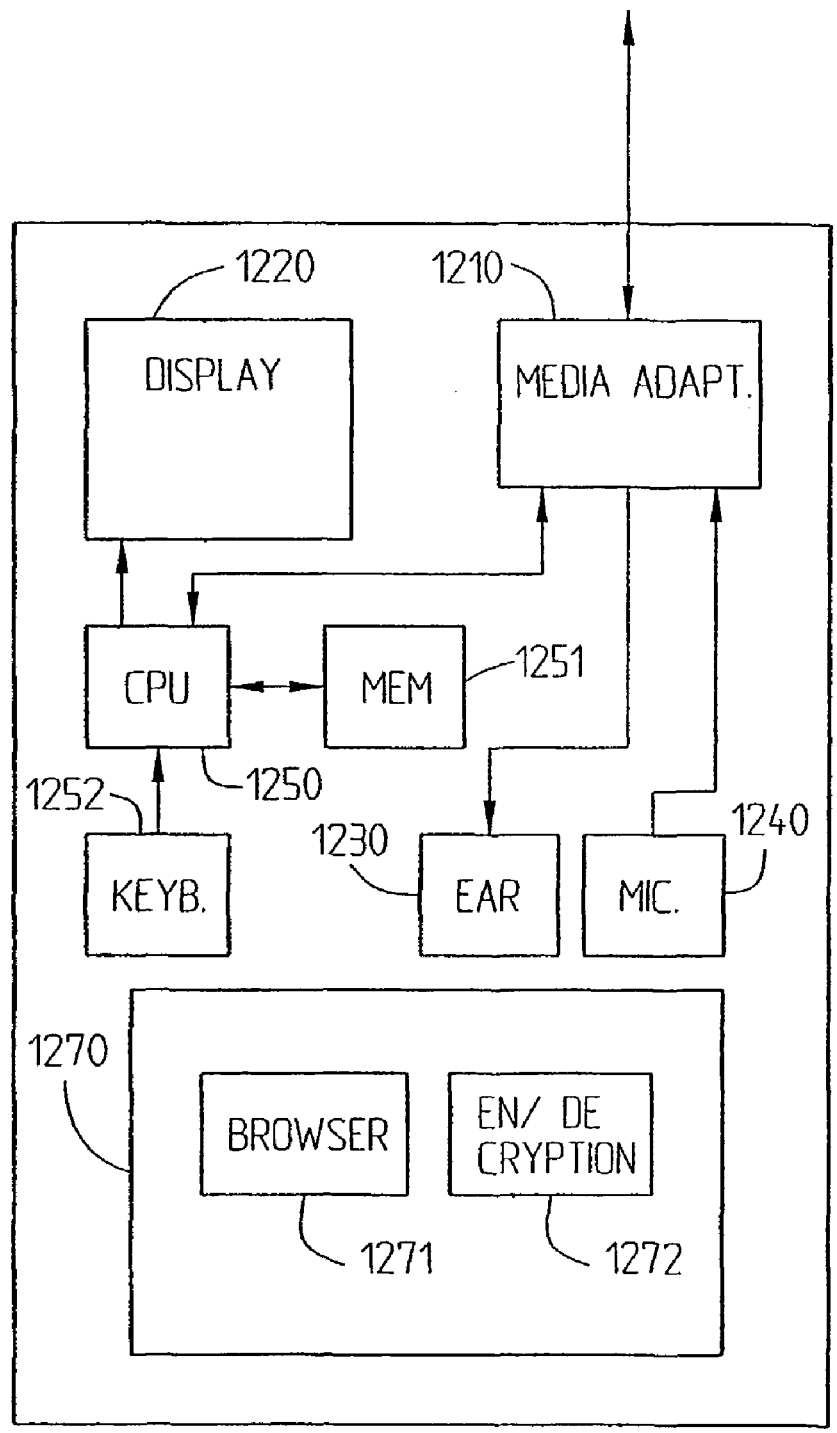
FIG. 11 illustrates an exemplary block diagram of a UE where the UE is connected to a fixed network according to one embodiment of the invention.

FIG. 11 illustrates a UE 100 according to a second variant of the invention when the UE 100 is a fixed telephone with graphic capabilities. According to this second variant, the UE 100 is equal to a mobile telephone as described in FIG. 7 but with the exception that the radio unit 710 and antenna 760 are replaced with a media adapter 1210 that converts incoming and outgoing signals to and from a particular media standard including but not limited to ISDN, ADSL, HDSL, VDSL and Cable networks and any combination thereof.

Figure 12:
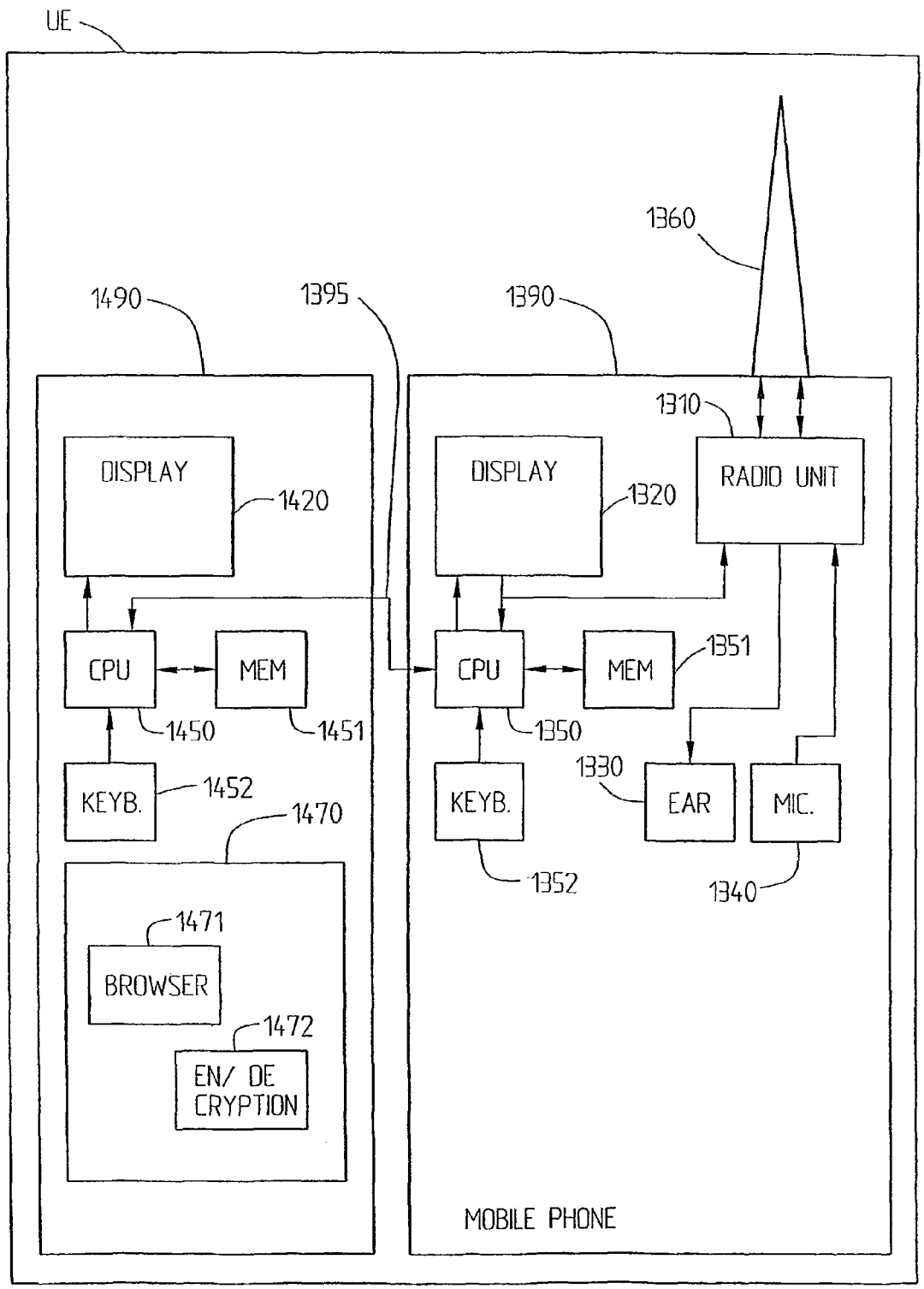
FIG. 12 illustrates an exemplary block diagram of a UE where the UE consists of a PDA and a mobile phone according to one embodiment of the invention.

FIG. 12 illustrates a UE 100 according to another embodiment of the invention when the UE 100 is a mobile telephone 1390 possibly without data object rendering capabilities, with an antenna 1360, connected to a PDA 1490 via a communication link 1395. The communication link may for example be realized with an infrared, radio (e.g. Bluetooth) or wire communication arrangement. The PDA 1490 further comprises a CPU 1450 connected to at least one memory unit 1451, and at least one display 1420. The CPU 1350 may also be connected to a keyboard device or area 1452 to allow subscribers to enter for example digits. The memory unit 1451 may be non-volatile (e.g. EEPROM or SIM card) in order to retain stored information, should power be temporarily unavailable. The PDA 1490 further comprises a collection of programs 1470 including but not limited to a browser 1471 that can render at least one type of data object and an encryption/decryption engine 1472 allowing data object requests to be encrypted and data objects to be decrypted. The mobile phone 1390 is further described in FIG. 7 where 1320 corresponds to 720, 1310 corresponds to 710, 1350 corresponds to 750, 1351 corresponds to 751, 1352 corresponds to 752, 1330 corresponds to 730 and 1340 corresponds to 1340.

The functionality of the present invention can either be preprogrammed into a user equipment or be loaded or downloaded into the user equipment. Alternatively a network operator may provide the application in a SIM card that is provided to the users for access to the a network.

Basically the invention can be said to provide an association between address indications such as telephone numbers to a data object such as an Internet address pointing to a phonepage. When a user dials a telephone number, an Internet address associated with for example the telephone number, is automatically obtained and the content located at the Internet address (i.e. the phonepage) is automatically downloaded and displayed on the user's telephone. At the same time, the user's own phonepage will be downloaded and displayed on the called party's telephone. Besides being associated with a telephone number (possibly both the owner's and also the requester's, giving a possibility to send different phonepages in dependence of who is requesting/receiving them), a phonepage is also associated with a particular event. Examples of such events are when the user dials a telephone number, answers a call, receives an incomming call or when a dialed number is busy. A user can have several different phonepages, each associated with one or several events. This allows a user to provide different types of information to other users depending on the situation. One useful example is the posibility for a user to provide additional information (such as an e-mail address) if he or she is busy or do not answer. In short the invention can be exemplified by:

A phonepage event occurs, e.g. a user dials a number on a telephone, e.g. a mobile phone. The mobile phone automatically sends a request to a phonepage number server asking for the Internet address (i.e. the location of the phonepage) associated with the dialed phone number.

The phonepage number server uses the telephone number together with other parameters to look up the Internet address in a database.

When the mobile phone receives the location of the phonepage, a browser, or an equivalent functionality, is and launched and a request to retrive the information at the Internet address is sent.

The phonepage content is downloaded to the mobile terminal.

The invention is not restricted to the above described embodiments, but may be varied within the scope of the following claims.

What is claimed is:

1. A method of retrieving information related to communication events, comprising:

determining the occurrence of a triggering event associated with a communication service between a first user communication application at a first user device and a second user communication application at a second user device;

assembling a data object request comprising a first parameter representing a communication service address associated with the second user communication application and a second parameter indicating which of a plurality of triggering events is determined;

sending the data object request to a data object server;

receiving, at the first user device, a data object corresponding to the first and second parameters of the data object request; and processing the received data object.

2. The method of claim 1, wherein the communication service is a data communication service.

3. The method of claim 2, wherein the communication service address comprises one of an e-mail address, an IPv4 address, a SIP address, or an IPv6 address.

4. The method of claim 1, wherein sending the data object request to a data object server comprises:

determining a server address based on one or more of a type of the communication service, a service provider of the communication service, or the geographic location of the first user communication application; and sending the data object request to the server address.

5. The method of claim 1, wherein the data object request further comprises one or more of:

a third parameter indicating one or more communication types available to the first user communication application;

a fourth parameter representing a priority of use for one or more of the communication types available to the first user communication application; and a fifth parameter representing a code indicating a type of communication service established with the second user communication application; and wherein the data object received at the first user device further corresponds to one or more of the third, fourth, and fifth parameters.

6. The method of claim 1, wherein the data object request further comprises a third parameter indicating an identity associated with the first user communication application, and wherein the data object received at the first user device further corresponds to the third parameter.

7. The method of claim 1, wherein the data object request further comprises a third parameter indicating the availability of an accessory device associated with the first user communication application, wherein the data object received at the first user device is adapted to the accessory device, and wherein processing the received data object comprises processing the received data object using the accessory device.

8. The method of claim 1, wherein the data object request further comprises a third parameter indicating a capability of the first user device, wherein the data object received at the first user communication application is adapted to the indicated capability, and wherein processing the received data object comprises processing the received data object according to the indicated capability.

9. The method of claim 1, wherein the received data object comprises a network address, and wherein processing the received data object comprises retrieving information using the network address.

10. The method of claim 9, wherein retrieving information using the network address comprises initiating an Internet browser application and using the Internet browser application to retrieve content from a server corresponding to the network address, and wherein the method further comprises displaying the retrieved content.

11. The method of claim 1, wherein the received data object comprises information associated with the second user communication application, and wherein processing the received data object comprises updating phonebook information associated with the first user communication application.

12. A user device for use with a communication system, wherein the user device is configured to:

determine the occurrence of a triggering event associated with a communication service between a first user communication application associated with the user device and a second user communication application associated with a remote user device;

assemble a data object request for a data object comprising a first parameter representing a communication service address associated with the second user communication application and a second parameter indicating which of a plurality of triggering events is determined;

send the data object request to a data object server;

receive, in response to the data object request, a data object corresponding to the first and second parameters of the data object request; and process the received data object.

13. The user device of claim 12, wherein the user device comprises a mobile telephone.

14. The user device of claim 12, wherein the received data object comprises a network address, and wherein the user device is configured to process the received data object by retrieving information using the network address.

15. The user device of claim 12, wherein the received data object comprises information associated with the remote device, and wherein the user device is configured to process the received data object by updating phonebook information at the user device.

16. The user device of claim 12, wherein the data object request further comprises a third parameter indicating the availability of an accessory device associated with the user device, wherein the received data object is adapted to the accessory device, and wherein the user device is configured to process the received data object using the accessory device.

17. A data object server for use in a communication system, configured to:

receive a data object request comprising a first parameter representing an address associated with a first user communication application at a first user device and a second parameter representing a triggering event associated with communication between the first user communication application and a second user communication application at a second user device;

select a data object based on the first and second parameters from a plurality of data objects associated with the first parameter; and send a message based on the selected data object to the second user device.

18. The data object server of claim 17, wherein the data object request comprises a third parameter indicating a capability of the second user device, wherein the data object server is further configured to adapt the selected data object according to the indicated capability, and wherein the message based on the selected data object comprises the adapted data object.

19. The data object server of claim 17, wherein the data object request comprises a third parameter indicating the availability of an accessory device associated with the second user device, wherein the data object server is further configured to adapt the selected data object according to the indicated accessory device, and wherein the message based on the data object comprises the adapted data object.

* * * * *